US007527829B2

(12) United States Patent
Yoshida et al.

(10) Patent No.: US 7,527,829 B2

(45) Date of Patent: May 5, 2009

(54) FLUID COLLOID CRYSTAL AND PROCESS FOR PRODUCING THREE-DIMENSIONAL ALIGNED PARTICLE MASS THEREFROM

(75) Inventors: Tetsuya Yoshida, Sayama (JP); Yuka Okuda, Sayama (JP); Youichi Takizawa, Sayama (JP); Junji Watanabe, Chigasaki (JP)

(73) Assignee: Soken Chemical & Engineering Co., Ltd., Tokyo (JP)

( * ) Notice: Subject to any disclaimer, the term of this patent is extended or adjusted under 35 U.S.C. 154(b) by 404 days.

(21) Appl. No.: 10/565,576

(22) PCT Filed: Jul. 30, 2004

(86) PCT No.: PCT/JP2004/010927

§ 371 (c)(1), (2), (4) Date: Jan. 23, 2006

(87) PCT Pub. No.: WO2005/012961

PCT Pub. Date: Feb. 10, 2005

(65) Prior Publication Data

US 2006/0182968 A1 Aug. 17, 2006

(30) Foreign Application Priority Data

Jul. 31, 2003 (JP) ............................ 2003-284551
Jul. 31, 2003 (JP) ............................ 2003-284552
Jan. 16, 2004 (JP) ............................ 2004-009899
Jan. 16, 2004 (JP) ............................ 2004-009900

(51) Int. Cl.
*B05D 1/38* (2006.01)
*B05D 5/12* (2006.01)

(52) U.S. Cl. ................ 427/384; 427/385.5; 427/388.1; 427/389.7; 427/389.9; 427/393; 427/393.5; 427/393.6; 427/394; 427/397; 427/407.1; 427/407.2; 427/408; 427/409; 427/412; 427/412.1

(58) Field of Classification Search ......... 427/58–126.6
See application file for complete search history.

(56) References Cited

U.S. PATENT DOCUMENTS 6,261,469 B1 7/2001 Zakhidov et al.

(Continued)

FOREIGN PATENT DOCUMENTS

JP 4-21334 A 8/1992

(Continued)

OTHER PUBLICATIONS

Yoshida, Tetsuya et al., "Alignment Control of Monodispersed Fine Particles for Application in Structural Color Materials", *The Institute of Electronics, Information and Communication Engineers*, Technical Report of IEICE, EID2002-131, Mar. 2003, pp. 25-28, vol. 102, No. 698 (4 pp.); English Translation (10 pp.).

(Continued)

*Primary Examiner*—Erma Cameron
(74) *Attorney, Agent, or Firm*—The Webb Law Firm

(57) ABSTRACT

Fluid colloidal crystals comprising a solid-liquid dispersion electrostatically charged at not more than 2000 μS/cm in terms of an electrical conductivity, wherein the solid-liquid dispersion comprises, as a dispersoid, electrostatically chargeable spherical colloidal particles of an organic or inorganic polymer having a mean volume diameter (d) of not more than 30 μm, and as a dispersion medium, an aqueous solution or a dissolving water-containing non-aqueous solution, the dispersion concentration of the spherical colloidal particles is not more than 70%, around the dispersoid an electric double layer of a given thickness (Δe) is formed, and the spherical colloidal particles form a three-dimensionally ordered lattice that shows fluidity and is a particle array structure in which the colloidal particles are aligned longitudinally and laterally in a lattice form while an interparticle distance (L) defined as a distance between centers of the particles arranged opposite to each other along the center line satisfies the relationship $(d)<(L)\leqq(d)+2(\Delta e)$. A process for producing a three-dimensionally ordered lattice, comprising drying the fluid colloidal crystals to form a three-dimensionally ordered lattice which is a homogeneous particle array structure constituted of the organic or inorganic monodisperse spherical fine particles of the dispersoid.

23 Claims, 4 Drawing Sheets

U.S. PATENT DOCUMENTS

| | | | | |
|---|---|---|---|---|
| 6,414,043 | B1 * | 7/2002 | Asher et al. | 521/61 |
| 6,894,086 | B2 * | 5/2005 | Munro et al. | 523/105 |
| 2004/0053009 | A1 * | 3/2004 | Ozin et al. | 428/168 |

FOREIGN PATENT DOCUMENTS

| | | | |
|---|---|---|---|
| JP | 4-213334 | A | 8/1992 |
| JP | 2001-206719 | A | 7/2001 |
| JP | 2001-239661 | A | 9/2001 |
| JP | 2002-128600 | A | 5/2002 |
| JP | 2002-527355T | A | 8/2002 |
| JP | 2003-98367 | A | 4/2003 |
| JP | 2004-269922 | * | 9/2004 |
| JP | 2004-276492 | * | 10/2004 |

OTHER PUBLICATIONS

Yoshida, Tetsuya et al., "Application to the Structural Color Materials for Arrangement Control of Monodisperse Acrylic Fine Particles", *Kai Polymer Zairyo Forum Yoshishu*, Oct. 15, 2002, pp. 269-270 (2 pp.); English Translation (6 pp.).

* cited by examiner

FLUID COLLOID CRYSTAL AND PROCESS FOR PRODUCING THREE-DIMENSIONAL ALIGNED PARTICLE MASS THEREFROM

TECHNICAL FIELD

The present invention relates to fluid colloidal crystals comprising a solid-liquid colloidal dispersion. More particularly, the invention relates to novel fluid colloidal crystals which comprise an ordered structure of a solid-liquid colloidal dispersion system, said ordered structure having fluidity and formed from organic or inorganic polymer spherical fine particles of colloidal particle size, and which show various properties inherent in the ordered structure, such as exhibition of excellent property reflection spectra under irradiation with visible rays, ultraviolet rays and infrared rays.

The present invention also relates to a process for producing a three-dimensionally ordered lattice, comprising drying the above-mentioned colloidal crystals to regularly, longitudinally and laterally align the organic or inorganic spherical fine particles present as a dispersoid.

Further, the present invention also relates to a process for producing a three-dimensionally ordered lattice of spherical fine particles, which is compositionally and structurally homogeneous and exhibits various properties based on the structural homogeneity, and a three-dimensionally ordered lattice obtained by this process.

Furthermore, the present invention also relates to a process for producing a three-dimensionally ordered lattice using, as a dispersoid, specific spherical fine particles which undergo development of clear chromatic colors and exhibit excellent ultraviolet ray reflection properties and excellent infrared ray reflection properties, a three-dimensionally ordered lattice obtained by this process, and a process for producing a coating film of a three-dimensionally ordered lattice of the specific spherical fine particles which undergo development of clear chromatic colors and exhibit excellent ultraviolet ray reflection properties and excellent infrared ray reflection properties.

BACKGROUND ART

In the case where human beings sense colors visually, three kinds of fluorescent substances of R, G and B emit light of primaries upon irradiation with electron beam, and the illuminant colors are visually sensed as chromatic colors, as in color TV. In addition, when a dye or a pigment in the form of a particle aggregate or a layer aggregate is irradiated with sunlight or white light, visible light of specific wavelength is absorbed by the dye or the pigment, and as a result, a chromatic color that is an object color can be visually sensed. In the case where such illuminant colors or object colors are visually sensed, visible light of specific wavelength region is absorbed or transmitted or reflected according to structural properties and surface properties of a substance irradiated with light, and any one of a transmitted light color, an absorbed light color and a reflected light color is predominantly sensed with the eye as a chromatic color. Further, when substances are irradiated with sunlight or white light, various phenomena or color developments, such as light refraction of rainbow, light diffraction of liquid crystal, blue sky, light scattering of sunset glow, and interference colors of oil film on water surface, soap bubbles and opal, take place, and it can be said that all of them are properties of aggregated or dispersed fine particle substances.

Such structural properties and surface properties of the substances are described in various literatures. For example, in Japanese Patent Laid-Open Publication No. 206719/2001 (patent document 1), with regard to colors visually sensed, it is described that in case of a thin film (single-layer or multilayer thin film of monodisperse titanium oxide) in which any color material such as a pigment is not used at all and monodisperse titanium oxide particles are piled on a substrate, the appearance color tone becomes an interference color tone of red to blue that is neither an object color of a dye or a pigment nor an illuminant color, according to the diameters of the particles. In Japanese Patent Laid-Open Publication No. 239661/2001 (patent document 2), it is described that a deposit of a regular periodic structure, which is obtained by aggregating and arranging monodisperse solid fine particles having a number-average particle diameter of 100 to 1000 nm and having light transmission properties on a surface of a liquid-repellent base layer of a synthetic resin or the like having a black or dark color so as to clearly see an interference color by means of drying, emits clear monochromatic light of an interference color. As the monodisperse colorless solid fine particles having light transmission properties, inorganic oxide fine particles, such as silica, alumina, titania, silica-alumina and titania-selenium, and organic polymer fine particles, such as (meth)acrylic resins, styrene resins and olefin resins, are described. Accordingly, any of the film and the deposit described in Japanese Patent Laid-Open Publication No. 206719/2001 and Japanese Patent Laid-Open Publication No. 239661/2001 undergoes development of visually sensed colors as structural properties and surface properties of the fine particles of colloidal particle size which are regularly dispersed or aggregated or laminated.

Further, there have been heretofore proposed various processes for producing particle laminates, comprising subjecting a solid-liquid dispersion or suspension containing monodisperse spherical fine particles dispersed as a dispersoid to casting, spraying, coating, migration or the like to arrange, align, dry and fix the particles and thereby regularly align the dispersoid spherical fine particles longitudinally and laterally on a flat base member. The particle laminate obtained by regularly aligning the spherical fine particles in the above manner is expected to exhibit various surface properties based on various properties inherent in the constituent particle substance. In particular, as the constituent particles become finer particles such as those having sizes of submicron order or nano order, the surface properties exhibited by the fine surface become more definite, and such constituent particles can be expected as functional substances having novel surface functions.

In addition to the object colors due to dyes or pigments or the illuminant colors such as those of color TV, there are interference colors as colors visually sensed, and as described above, in Japanese Patent Laid-Open Publication No. 206719/2001, there has been proposed a monodisperse titanium oxide single-layer or multi-layer thin film in which monodisperse titanium oxide particles using no colorant such as a pigment are piled on a substrate and an appearance color tone of which becomes an interference color tone of red to blue according to the diameters of the particles. It is also described that there can be formed a monodisperse titanium oxide thin film whose appearance interference color tone can be freely controlled from red to blue according to the particle diameters by changing the diameters of the monodisperse titanium oxide particles. In Japanese Patent Laid-Open Publication No. 239661/2001, it is described that a deposit of a regularly periodic structure, which is obtained by aggregating and arranging monodisperse solid fine particles having light transmission properties on a surface of a liquid-repellent synthetic resin base layer of a black or dark color having a lightness of not more than 6 and a saturation of not more than 8 in a standard color solid so as to clearly see an interference color, emits clear monochromatic light of an interference color. The uncolored solid fine particles constituting the deposit are monodisperse particles, and as the solid fine particles, inorganic oxide fine particles, such as silica, alumina, titania, silica-alumina and titania-selenium, and organic polymer fine particles, such as (meth)acrylic resins, styrene resins and olefin resins, are described. It is also described that the number-average particle diameter of the solid fine particles is in the range of 100 nm to 1 μm. In Japanese Patent Laid-Open Publication No. 213334/2004 (patent document 3), there is described a process for producing an orderly arranged multilayer laminate structure, comprising subjecting a solid-liquid suspension containing spherical monodisperse polymer particles of 200 to 700 nm prepared by emulsion polymerization to dialysis to substantially remove an electrolyte from the suspension, drying (temperature: 60° C.) the suspension containing the spherical monodisperse polymer particles having an electric double layer formed thereon while allowing the suspension to stand still, and then chemically fixing the arranged particles which are in contact with one another.

Under such circumstances as mentioned above, regarding the color development as the structural properties and the surface properties of substances, the present inventors have already proposed a process for forming a dry particle laminate, comprising preparing an aqueous dispersion in which organic or inorganic monodisperse spherical particles of colloidal particle size (particle diameter: several hundreds nm) previously colored a black color type achromatic color of gray to black with a dye or a pigment are dispersed, forming a green sheet (or suspension layer) of a given thickness using the aqueous dispersion (or suspension), and then sufficiently drying the green sheet to densely align the organic or inorganic monodiserpse spherical particles of a black color type achromatic color longitudinally and laterally. When a surface of the dry particle laminate is irradiated with natural light (or white light) in the visible wavelength region of 380 to 780 nm, the vertically reflected light color visually sensed is a clear deep chromatic color of red, green or blue by virtue of the specific particle diameters of the spherical particles. That is to say, the dry particle laminate becomes an optical color-developing material.

Consequently, the optical color-developing material of a dry type which develops a chromatic color satisfies the following requirements (1) to (3). The colors developed by such material are apparently distinguished from the object colors of the conventional dyes or pigments or the illuminant colors of color TV or the like, and under irradiation with visible rays, clear chromatic colors are visually sensed. The present inventors call such an optical color-developing material a "structural color-developing material".

(1) The dry laminate which develops a chromatic color visually sensed is a three-dimensional particle laminate having a surface wherein organic or inorganic monodisperse spherical particles of at least a black color type achromatic color such as gray, blackish brown or black are aligned longitudinally and laterally as previously described.

(2) The organic or inorganic monodisperse spherical particles of a black color type achromatic color are spherical fine particles having a specific particle diameter of colloidal particle size, namely, a mean volume diameter (d) of 130 to 350 nm.

(3) Attributably to the monodisperse spherical particles of specific particle diameter constituting the dry particle laminate, the surface of the particle laminate undergoes, as the structural properties, development of a chromatic spectral diffraction color, such as purple color, blue color, green color, yellow color and red color, according to the specific particle diameter under irradiation with visible light.

By the way, a dry process wherein a solid-liquid suspension containing dispersed fine particles of colloidal particle size is dried to form an aggregate or a laminate of the fine particles has been heretofore studied. When such a solid-liquid dispersion (suspension layer) having a considerable thickness is dried, the dispersoid colloidal particles are aggregated and aligned with the progress of drying, and usually, cracks due to shrinkage on drying tend to occur on the surface. It is general that the tendency of occurrence of such cracks due to shrinkage on drying is increased as the surface area of the suspension layer to be dried becomes larger or the thickness of the suspension layer becomes larger.

That is to say, in the drying of the solid-liquid suspension, numerous cracks ranging from cracks having a width of about 1 μm which are hardly observed with the naked eye to cracks having a width of several mm which can be readily observed with the naked eye are usually formed on the surface with the progress of drying. On the surface of the aqueous or oily dispersion containing fine particles, the suspended fine particles are aggregated and aligned by the capillary force with evaporation of water or an organic solvent, and the dispersion medium (may be a dispersion medium containing a binder resin component) present among the fine particles is so shrunk by drying that a uniform surface cannot be held, and this shrinkage remains as a crack.

In case of the conventional structural color-developing materials, even if no crack is observed on the surface, there is a tendency that the ordered structure includes a layer wherein the particles are not sufficiently aligned longitudinally and laterally or that an ordered structure wherein the particles are aligned in different directions is formed. In the existing circumstance, therefore, purity of the ordered structure has not been satisfied yet.

When the solid-liquid suspension is dried, the dispersed particles are aggregated to form an aggregate, but in usual, on the surface of such a solid-liquid suspension (or dispersion) layer, cracks tend to be formed because of shrinkage on drying. It is general that the tendency of occurrence of cracks due to shrinkage on drying is increased as the surface area of the suspension layer to be dried becomes larger or the thickness of the suspension layer becomes larger.

That is to say, in the drying of the solid-liquid suspension, numerous cracks ranging from cracks having a width of about 1 μm which are hardly observed with the naked eye to cracks having a width of several mm which can be readily observed with the naked eye are usually formed on the surface with the progress of drying. On the surface of the aqueous or oily dispersion containing suspended fine particles, the suspended fine particles are aggregated and aligned by the capillary force with evaporation of water or an organic solvent, and the dispersion medium (may be a dispersion medium containing a binder resin component) present among the fine particles is so shrunk by drying that a uniform surface cannot be held, and this shrinkage remains as a crack.

Then, in Japanese Patent Laid-Open Publication No. 59210/2003 (patent document 4) that is a previous application for patent, the present inventors have proposed a method for aggregating and aligning spherical fine particles in a non-dry system to form a three-dimensionally ordered lattice from the spherical fine particles of colloidal particle size in the solid-liquid suspension. This method comprises immersing a pair of electrode plates in the suspension containing colloidal particles and performing electrophoresis to deposit (or electrodeposit) a particle laminate on the electrode plates, and this method is a method enabling particle alignment free from cracks due to shrinkage on drying.

The thus deposited particle laminate that is a three-dimensionally ordered lattice formed by electrophoresis is an optical color-developing material undergoing clear chromatic color development and is a three-dimensionally ordered lattice formed in a non-dry system.

In Japanese Patent Laid-Open Publication No. 73123/2003 (patent document 5) that is a previous application for patent, the present inventors have proposed a particle laminate as an optical color-developing material. This particle laminate is obtained by casting a solid-liquid suspension containing colloidal particles onto a sheet (flat base member, referred to as a "color-developing substrate sheet") provided with regularly arranged deep-ditch divisions having an opening of 50 to 170 μm and an aspect ratio of 0.4 to 0.8, similarly to a mesh material, to form a suspension layer of a given thickness and drying the layer at a temperature of 50 to 60° C., and this particle laminate is effectively prevented from occurrence of cracks due to shrinkage on drying and develops a clear chromatic color.

That is to say, the optical color-developing material (particle laminate) proposed by the present inventors in the above specification is as follows.

(1) The particle laminate which develops a chromatic color visually sensed is a particle laminate having a surface wherein organic or inorganic monodisperse spherical particles of a black color type achromatic color are regularly aligned longitudinally and laterally.

(2) The organic or inorganic spherical particles constituting the laminate surface are monodisperse spherical particles of at least a black color type achromatic color such as gray, blackish brown or black.

(3) The monodisperse organic or inorganic spherical particles of a black color type achromatic color have a specific particle diameter, namely, a mean volume diameter (d) of 130 to 350 nm.

(4) When the surface of the particle laminate of the optical color-developing material constituted of, for example, organic polymer spherical particles is irradiated with visible rays, the vertically reflected light color visually sensed is a deep chromatic color, such as purple color, blue color, green color, yellow color or red color.

(5) In case of (meth)acrylic polymer monodisperse spherical particles, the vertically reflected light color visually sensed and the specific mean volume diameter (d) satisfy the following relationship:

(I) when d is in the range of 160 to 170 nm, the chromatic color developed is purple (P), (II) when d is in the range of 180 to 195 nm, the chromatic color developed is blue (B), (III) when d is in the range of 200 to 230 nm, the chromatic color developed is green (G), (IV) when d is in the range of 240 to 260 nm, the chromatic color developed is yellow (Y), and (V) when d is in the range of 270 to 290 nm, the chromatic color developed is red (R).

However, even if no crack is observed on the surface of the heretofore proposed particle laminate (or three-dimensionally ordered lattice) formed by drying a solid-liquid suspension and thereby arranging and aligning the dispersoid particles, there is a tendency that the ordered structure includes a layer wherein the particles are not sufficiently aligned longitudinally and laterally or that an ordered structure wherein the particles are aligned in different directions is formed, so that the ordered structure lacks structural homogeneity. In the existing circumstance, therefore, the properties exhibited have not been satisfied yet because of heterogeneity and a defective structure of the ordered structure.

Under such circumstances as mentioned above, the present inventors have earnestly studied in order to solve the above problems, and as a result, they have prepared an aqueous suspension using acrylic polymer colloidal particles which are monodisperse spherical particles of a black color type achromatic color having a mean volume diameter of 200 nm and containing carboxyl groups in a high concentration. The present inventors have found that a solid-liquid colloidal dispersion obtained by subjecting the above-prepared suspension having an electrical conductivity of 4000 μS/m to electrophoresis to reduce its electrical conductivity to 400 μS/cm and concentrating the resulting suspension to a volume concentration of colloidal particles of about 42% develops a chromatic color of clear red as a visually sensed color. Based on the finding, the present invention has been accomplished.

It is an object of the present invention to provide novel fluid colloidal crystals which comprise a solid-liquid dispersion, are used for producing a fluid ordered structure of organic or inorganic polymer spherical fine particles of colloidal particle size, and exhibit an excellent property reflection spectrum under irradiation with visible rays, ultraviolet rays and infrared rays.

It is another object of the present invention to provide a process for producing the above-mentioned novel fluid colloidal crystals.

It is a further object of the present invention to provide a process for producing a coating film of a three-dimensionally ordered lattice of spherical fine particles using a three-dimensionally ordered lattice which is extremely homogeneous as a particle array structure.

SUMMARY OF THE INVENTION

The fluid colloidal crystals of the present invention are fluid colloidal crystals comprising a solid-liquid colloidal dispersion containing monodisperse spherical colloidal particles as a dispersoid, wherein:

the spherical colloidal particles are organic or inorganic polymer monodisperse dispersoid spherical colloidal particles having a mean volume diameter (d) of not more than 30 μm, the solid-liquid colloidal dispersion comprises the dispersoid having a dispersion concentration, as expressed on the volume basis, of not less than 20% and not more than 70% and an aqueous solution or a dissolving water-containing non-aqueous solution as a dispersion medium, around the dispersoid spherical colloidal particles in the solid-liquid colloidal dispersion having an electrostatic charging degree of not more than 2000 μS/cm in terms of an electrical conductivity, an electric double layer of a given thickness (Δe) is formed at a temperature of not lower than the freezing point of the dispersion medium solution, and the dispersoid spherical colloidal particles form a three-dimensionally ordered lattice that shows fluidity and is a particle array structure in which the spherical colloidal particles are longitudinally and laterally aligned in a lattice form while an interparticle distance (L) defined as a distance between centers of the particles arranged opposite to each other along the center line satisfies the relationship $(d)<(L)\leqq(d)+2(\Delta e)$.

It is preferable that the dispersoid spherical colloidal particles are organic or inorganic polymer monodisperse specific spherical colloidal particles having one black color type achromatic color selected from grayish white, gray, grayish black and black and having an mean volume diameter (d) of 130 to 350 nm, and the three-dimensionally ordered lattice comprising these particles develops a clear chromatic spectral diffraction color under irradiation with natural light or white light.

In the fluid colloidal crystals of the invention, the chromatic spectral diffraction color visually sensed, which is a vertical color appearance on the three-dimensionally ordered lattice, and the interparticle distance (L) preferably satisfy any one of the following relationships (I) to (V)

(I) when (L) is in the range of 160 to 170 nm, the chromatic color developed is clear purple (P), (II) when (L) is in the range of 180 to 195 nm, the chromatic color developed is clear blue (B), (III) when (L) is in the range of 200 to 230 nm, the chromatic color developed is clear green (G), (IV) when (L) is in the range of 240 to 260 nm, the chromatic color developed is clear yellow (Y), and (V) when (L) is in the range of 270 to 290 nm, the chromatic color developed is clear red (R).

It is preferable that the dispersoid colloidal particles are organic or inorganic polymer monodisperse specific spherical colloidal particles having an mean volume diameter (d) of 10 to 130 nm, and the three-dimensionally ordered lattice comprising these particles exhibits ultraviolet ray reflection properties under irradiation with ultraviolet rays having a wavelength of not more than 400 nm.

It is preferable that the dispersoid colloidal particles are organic or inorganic polymer monodisperse specific spherical colloidal particles having a mean volume diameter (d) of 350 to 800 nm, and the three-dimensionally ordered lattice comprising these particles exhibits infrared ray reflection properties under irradiation with infrared rays having a wavelength of 800 to 1500 nm.

In the present invention, the dispersoid colloidal particles are preferably organic polymer spherical particles of at least one polymer selected from (meth)acrylic polymers, (meth) acrylic-styrene polymers, fluorine substituted (meth)acrylic polymers and fluorine substituted (meth)acrylic-styrene polymers.

The three-dimensionally ordered lattice can be produced by a production process (first production process of the invention) comprising:

preparing fluid colloidal crystals (S-1) comprising, as a dispersoid, organic or inorganic polymer monodisperse spherical colloidal particles having a mean volume diameter (d) of not more than 30 μm, and as a dispersion medium, an aqueous solution or a dissolving water-containing non-aqueous solution, wherein the dispersion concentration of the colloidal particles, as expressed on the volume basis, is not less than 20% and not more than 70%, around the dispersoid spherical colloidal particles in the solid-liquid colloidal dispersion having an electrostatic charging degree of not more than 2000 μS/cm in terms of an electrical conductivity, an electric double layer of a given thickness (Δe) is formed at a temperature of not lower than the freezing point of the dispersion medium solution, and the dispersoid spherical colloidal particles form a three-dimensionally ordered lattice that shows fluidity and is a particle array structure in which the spherical colloidal particles are longitudinally and laterally aligned in a lattice form while an interparticle distance (L) defined as a distance between centers of the particles arranged opposite to each other along the center line satisfies the relationship $(d)<(L)\leqq(d)+2(\Delta e)$, then forming a green sheet of the suspension of the above (S-1) and exposing the green sheet to an atmosphere having a temperature exceeding a freezing point of the dispersion medium to dry it and thereby form a three-dimensionally ordered lattice of the spherical fine particles regularly aligned longitudinally and laterally, and subsequently applying or spraying any one of a polymerizable organic monomer solution, an organic polymer solution and an inorganic binder solution so as to fill a surface of the three-dimensionally ordered lattice and gaps among the three-dimensionally aligned particles, followed by polymerization or curing.

Further, the three-dimensionally ordered lattice of the invention can be also produced by a production process (second production process of the invention) comprising:

preparing fluid colloidal crystals (S-2) comprising, as a dispersoid, organic or inorganic polymer monodisperse spherical fine particles having one black color type achromatic color selected from grayish white, gray, grayish black and black and having a mean volume diameter (d) of 130 to 350 nm, and as a dispersion medium, an aqueous solution or a dissolving water-containing non-aqueous solution, wherein the dispersion concentration of the dispersoid, as expressed on the volume basis, is not less than 20% and not more than 70%, and the electrical conductivity of the solid-liquid dispersion is not more than 2000 μS/cm, then forming a green sheet of the suspension of the above (S-2) and exposing the green sheet to an atmosphere having a temperature exceeding a freezing point of the dispersion medium to dry it and thereby form a three-dimensionally ordered lattice of the spherical fine particles regularly aligned longitudinally and laterally, and subsequently applying or spraying any one of a polymerizable organic monomer solution, an organic polymer solution and an inorganic binder solution, a refractive index (nB) of a polymer or a cured product obtained from said solution being different from a refractive index (nP) of the spherical fine particles, so as to fill a surface of the three-dimensionally ordered lattice and gaps among the three-dimensionally aligned particles, followed by polymerization or curing.

Furthermore, the three-dimensionally ordered lattice of the invention can be also produced by a production process (third production process of the invention) comprising:

preparing fluid colloidal crystals (S-3) comprising, as a dispersoid, organic or inorganic polymer monodisperse spherical fine particles having a mean volume diameter (d) of 10 to 130 nm, and as a dispersion medium, an aqueous solution or a dissolving water-containing non-aqueous solution, wherein the dispersion concentration of the dispersoid, as expressed on the volume basis, is not less than 20% and not more than 70%, and the electrical conductivity of the solid-liquid dispersion is not more than 2000 μS/cm, then forming a green sheet of the suspension of the above (S-3) and exposing the green sheet to an atmosphere having a temperature exceeding a freezing point of the dispersion medium to dry it and thereby form a three-dimensionally ordered lattice of the spherical fine particles regularly aligned longitudinally and laterally, and subsequently applying or spraying any one of a polymerizable organic monomer solution, an organic polymer solution and an inorganic binder solution, a refractive index (nB) of a polymer or a cured product obtained from said solution being different from a refractive index (nP) of the spherical fine particles, so as to fill a surface of the three-dimensionally ordered lattice and gaps among the three-dimensionally aligned particles, followed by polymerization or curing.

Moreover, the three-dimensionally ordered lattice of the invention can be also produced by a production process (fourth production process of the invention) comprising:

preparing fluid colloidal crystals (S-4) comprising, as a dispersoid, organic or inorganic polymer monodisperse spherical fine particles having a mean volume diameter (d) of 350 to 800 nm, and as a dispersion medium, an aqueous solution or a dissolving water-containing non-aqueous solution, wherein the dispersion concentration of the dispersoid, as expressed on the volume basis, is not less than 20% and not more than 70%, and the electrical conductivity of the solid-liquid dispersion is not more than 2000 μS/cm, then forming a green sheet of the suspension of the above (S-4) and exposing the green sheet to an atmosphere having a temperature exceeding a freezing point of the dispersion medium to dry it and thereby form a three-dimensionally ordered lattice of the spherical fine particles regularly aligned longitudinally and laterally, and subsequently applying or spraying any one of a polymerizable organic monomer solution, an organic polymer solution and an inorganic binder solution, a refractive index (nB) of a polymer or a cured product obtained from said solution being different from a refractive index (nP) of the spherical fine particles, so as to fill a surface of the three-dimensionally ordered lattice and gaps among the three-dimensionally aligned particles, followed by polymerization or curing.

In the production process of the invention, the binder is preferably a transparent binder satisfying the relationship $|nP-nB| \geqq 0.05$.

In the production process of the invention, the green sheet is preferably formed on a supporting member which is a mesh material made of stainless steel, a fluororesin or nylon and having deep-ditch divisions having an opening of 1 to 10 mm and an aspect ratio of 0.4 to 0.8.

In the production process of the invention, the monodisperse spherical fine particles are preferably organic polymer spherical particles of at least one polymer selected from (meth)acrylic polymers, (meth)acrylic-styrene polymers, fluorine substituted (meth)acrylic polymers and fluorine substituted (meth)acrylic-styrene polymers.

The process for producing a coating film of a three-dimensionally ordered lattice of spherical fine particles according to the present invention comprises:

preparing fluid colloidal crystals (S-5) comprising, as a dispersoid, organic or inorganic polymer monodisperse spherical fine particles having a mean volume diameter (d) of 0.01 to 30 μm, and as a dispersion medium, an aqueous solution or a dissolving water-containing non-aqueous solution, wherein the dispersion concentration of the dispersoid, as expressed on the volume basis, is not less than 20% and not more than 70%, and the electrical conductivity of the solid-liquid dispersion is not more than 2000 μS/cm, applying the fluid colloidal crystals (S-5) onto a plate selected from a glass plate, a plastic plate, a steel plate, an aluminum plate, a stainless steel plate, a ceramic plate, a wood plate and a fabric sheet, then exposing the coated plate to an atmosphere having a temperature exceeding a freezing point of the dispersion medium to dry it and thereby form a three-dimensionally ordered lattice of the spherical fine particles regularly aligned longitudinally and laterally on the plate, and subsequently applying or spraying any one of a polymerizable organic monomer solution, an organic polymer solution and an inorganic binder solution so as to fill a surface of the three-dimensionally ordered lattice and gaps among the three-dimensionally aligned particles, followed by polymerization or curing to fix the three-dimensionally ordered lattice of spherical fine particles as a coating film.

According to the present invention, there can be obtained fluid colloidal crystals in the form of a solid-liquid colloidal dispersion containing monodisperse spherical colloidal particles dispersed as a dispersoid. The monodisperse spherical colloidal particles contained in the solid-liquid dispersion form a three-dimensionally ordered lattice which is a particle array structure and clearly shows fluidity. The dispersoid spherical colloidal particles are organic or inorganic polymer monodisperse spherical colloidal particles having a mean volume diameter (d) of not more than several μm.

In the solid-liquid colloidal dispersion, the dispersoid spherical colloidal particles are dispersed in an aqueous dispersion medium solution or a dissolving water-containing non-aqueous dispersion medium solution in a dispersion concentration, as expressed on the volume basis, of not less than 20% and not more than 70%.

Around the dispersoid spherical colloidal particles in the solid-liquid colloidal dispersion having an electrostatic charging degree of not more than 2000 μS/cm in terms of an electrical conductivity, an electric double layer of a given thickness (Δe) is formed at a temperature of not lower than the freezing point of the dispersion medium solution.

In the fluid colloidal crystals, the dispersoid spherical colloidal particles form a three-dimensionally ordered lattice that shows fluidity and is a particle array structure in which the spherical colloidal particles are longitudinally and laterally aligned in a lattice form while an interparticle distance (L) defined as a distance between centers of the particles arranged opposite to each other along the center line satisfies the relationship $(d)<(L)\leqq(d)+2(\Delta e)$.

When the monodisperse spherical fine particles dispersed as a dispersoid in the fluid colloidal crystals are aligned on, for example, a flat base member and observed by a scanning electron microscope, it is found that the spherical fine particles are regularly arranged and aligned longitudinally and laterally to form a three-dimensionally ordered lattice of spherical fine particles, which is an extremely homogeneous particle array structure almost free from a different particle array.

That is to say, in the "first production process" of the invention, the fluid colloidal crystals (S-1) comprising, as a dispersoid, organic or inorganic polymer monodisperse spherical fine particles having a mean volume diameter (d) of 0.01 to 30 μm are prepared, then a green sheet of the suspension of the above (S-1) is formed, and thereafter, the green sheet is exposed to an atmosphere having a temperature exceeding a freezing point of the dispersion medium to dry it.

Thus, a three-dimensionally ordered lattice (SPL-1) wherein the monodisperse spherical fine particles are regularly aligned longitudinally and laterally is formed in the green sheet.

Subsequently, any one of a polymerizable organic monomer solution, an organic polymer solution and an inorganic binder solution is applied or sprayed so as to fill a surface of the three-dimensionally ordered lattice and gaps among the three-dimensionally aligned particles, followed by polymerization or curing, whereby a three-dimensionally ordered lattice of spherical fine particles sealed with the binder can be produced as a stable particle array structure without disordering homogeneous particle array of the three-dimensionally ordered lattice (SPL-1).

When specific spherical fine particles having a black color type achromatic color of gray to black are used as the monodisperse spherical fine particles to be dispersed as a dispersoid in the solid-liquid suspension and they are aligned on, for example, a flat base member and observed by a scanning electron microscope, it is found that the specific spherical fine particles of a black color type achromatic color are regularly arranged and aligned longitudinally and laterally to form a three-dimensionally ordered lattice of spherical fine particles, which is almost free from a different particle array and develops a clear chromatic diffraction color under irradiation with natural light or white light.

That is to say, in the "second production process" of the invention, the fluid colloidal crystals (S-2) comprising, as a dispersoid, organic or inorganic polymer monodisperse specific spherical fine particles having one black color type achromatic color selected from grayish white, gray, grayish black and black and having a mean volume diameter (d) of a specific range of 130 to 350 nm are prepared.

Then, a green sheet of the suspension of the above (S-2) is formed, and thereafter, the green sheet is exposed to an atmosphere having a temperature exceeding a freezing point of the dispersion medium to dry it and thereby form a three-dimensionally ordered lattice (SPL-2) wherein the specific spherical fine particles are regularly aligned longitudinally and laterally.

Subsequently, any one of a polymerizable organic monomer solution, an organic polymer solution and an inorganic binder solution, a refractive index (nB) of a polymer or a cured product obtained from said solution being different from a refractive index (nP) of the spherical fine particles, is applied or sprayed so as to fill a surface of the three-dimensionally ordered lattice and gaps among the three-dimensionally aligned particles, followed by polymerization or curing, whereby a three-dimensionally ordered lattice (SPL-2, chromatic color-developing three-dimensionally ordered lattice) of spherical fine particles sealed with the organic resin binder or the inorganic binder, which develops a clear chromatic spectral diffraction color under irradiation with natural light or white light, can be produced.

When organic or inorganic polymer monodisperse specific spherical fine particles having a mean volume diameter (d) of a specific range of 10 to 130 nm are used as the monodisperse spherical fine particles to be dispersed as a dispersoid in the solid-liquid suspension and they are aligned on, for example, a flat base member and observed by a scanning electron microscope, it is found that the specific spherical fine particles are regularly aligned longitudinally and laterally to form a three-dimensionally ordered lattice of spherical fine particles, which is almost free from a different particle array and exhibits a property reflection spectrum and excellent ultraviolet ray reflection properties under irradiation with ultraviolet rays of not more than 400 nm.

That is to say, in the "third production process" of the invention, the fluid colloidal crystals (S-3) comprising, as a dispersoid, organic or inorganic polymer monodisperse spherical fine particles having a mean volume diameter (d) of a specific range of 10 to 130 nm are prepared.

Then, a green sheet of the suspension of the above (S-3) is formed, and thereafter, the green sheet is exposed to an atmosphere having a temperature exceeding a freezing point of the dispersion medium to dry it and thereby form a three-dimensionally ordered lattice wherein the specific spherical fine particles are regularly aligned longitudinally and laterally.

Subsequently, a polymerizable organic monomer solution, an organic polymer solution or an inorganic binder solution is applied or sprayed so as to fill a surface of the three-dimensionally ordered lattice and gaps among the three-dimensionally aligned particles, followed by polymerization or curing, whereby a three-dimensionally ordered lattice (ultraviolet ray reflecting three-dimensionally ordered lattice) of spherical fine particles sealed with the organic resin binder or the inorganic binder, which exhibits ultraviolet ray reflection properties under irradiation with ultraviolet rays having a wavelength of not more than 400 nm, can be produced.

When organic or inorganic polymer specific spherical fine particles having a mean volume diameter (d) of 350 to 800 nm are used as the monodisperse spherical fine particles to be dispersed as a dispersoid in the solid-liquid suspension and they are aligned on, for example, a flat base member and observed by a scanning electron microscope, it is found that the specific spherical fine particles are regularly aligned longitudinally and laterally to form a three-dimensionally ordered lattice of spherical fine particles, which is almost free from a different particle array and exhibits a property reflection spectrum and excellent infrared ray reflection properties under irradiation with infrared rays having a wavelength of 800 to 1500 nm.

That is to say, in the "fourth production process" of the invention, the fluid colloidal crystals (S-4) comprising, as a dispersoid, organic or inorganic polymer monodisperse spherical fine particles having a mean volume diameter (d) of a specific range of 350 to 800 nm are prepared.

Then, a green sheet of the suspension of the above (S-4) is formed, and thereafter, the green sheet is exposed to an atmosphere having a temperature exceeding a freezing point of the dispersion medium to dry it and thereby form a three-dimensionally ordered lattice wherein the spherical fine particles are regularly aligned longitudinally and laterally.

Subsequently, any one of a polymerizable organic monomer solution, an organic polymer solution and an inorganic binder solution is applied or sprayed so as to fill a surface of the three-dimensionally ordered lattice and gaps among the three-dimensionally aligned particles, followed by polymerization or curing, whereby a three-dimensionally ordered lattice of spherical fine particles sealed with the organic resin binder or the inorganic binder, which exhibits infrared ray reflection properties under irradiation with infrared rays having a wavelength of 800 to 1500 nm, can be produced.

According to the present invention, the suspension (S-1) obtained by the "first production process" for producing a three-dimensionally ordered lattice of spherical fine particles is applied as a coating liquid onto a plate to form a coating film of a three-dimensionally ordered lattice of spherical fine particles exhibiting structurally homogeneous surface properties.

That is to say, a suspension (S-1) comprising, as a dispersoid, organic or inorganic polymer monodisperse spherical fine particles having a mean volume diameter (d) of 0.01 to 30 μm, and as a dispersion medium, an aqueous solution or a dissolving water-containing non-aqueous solution, wherein the dispersion concentration of the dispersoid, as expressed on the volume basis, is not less than 20% and not more than 70%, and the electrical conductivity of the solid-liquid dispersion is not more than 2000 μS/cm, is prepared.

Then, the suspension (S-1) is applied as a coating liquid onto a plate selected from a glass plate, a plastic plate, a steel plate, an aluminum plate, a stainless steel plate, a ceramic plate, a wood plate and a fabric sheet to form a green sheet of the suspension (S-1).

Subsequently, the green sheet is exposed to an atmosphere having a temperature exceeding a freezing point of the dispersion medium to dry it and therfeby form a three-dimensionally ordered lattice of spherical fine particles regularly aligned longitudinally and laterally on the plate.

Then, any one of a polymerizable organic monomer solution, an organic polymer solution and an inorganic binder solution is applied or sprayed so as to fill a surface of the three-dimensionally ordered lattice and gaps among the three-dimensionally aligned particles, followed by polymerization or curing to fix the three-dimensionally ordered lattice of spherical fine particles as a coating film with the organic resin binder or the inorganic binder. As a result, a coating film of a three-dimensionally ordered lattice of spherical fine particles is obtained.

According to the present invention, further, the suspension (S-2) obtained by the "second production process" for producing a three-dimensionally ordered lattice of spherical fine particles is applied as a coating liquid onto a plate to obtain a homogeneous coating film of a three-dimensionally ordered lattice of specific spherical fine particles, specifically, a coating film of a chromatic color-developing three-dimensionally ordered lattice of specific spherical fine particles developing a clear chromatic color under irradiation with natural light or white light.

That is to say, a suspension (S-2) comprising, as a dispersoid, organic or inorganic polymer monodisperse specific spherical fine particles having one black color type achromatic color selected from grayish white, gray, grayish black and black and having a mean volume diameter (d) of 130 to 350 nm, and as a dispersion medium, an aqueous solution or a dissolving water-containing non-aqueous solution, wherein the dispersion concentration of the dispersoid, as expressed on the volume basis, is not less than 20% and not more than 70%, and the electrical conductivity of the solid-liquid dispersion is not more than 2000 μS/cm, is prepared.

Then, the suspension (S-2) is applied as a coating liquid onto a plate selected from a glass plate, a plastic plate, a steel plate, an aluminum plate, a stainless steel plate, a ceramic plate, a wood plate and a fabric sheet to form a green sheet of the suspension (S-2).

Subsequently, the green sheet is exposed to an atmosphere having a temperature exceeding a freezing point of the dispersion medium to dry it and thereby form a three-dimensionally ordered lattice of specific spherical fine particles regularly aligned longitudinally and laterally on the plate.

Then, any one of a polymerizable organic monomer solution, an organic polymer solution and an inorganic binder solution, a refractive index (nB) of a polymer or a cured product obtained from said solution being different from a refractive index (nP) of the spherical fine particles, is applied or sprayed so as to fill a surface of the three-dimensionally ordered lattice and gaps among the three-dimensionally aligned particles, followed by polymerization or curing to fix, as a coating film, the three-dimensionally ordered lattice of spherical fine particles developing a clear chromatic spectral diffraction color under irradiation with natural light or white light. As a result, a coating film of a chromatic color-developing three-dimensionally ordered lattice of specific spherical fine particles is obtained.

According to the present invention, further, the suspension (S-3) obtained by the "third production process" for producing a three-dimensionally ordered lattice of spherical fine particles is applied as a coating liquid onto a plate to obtain a homogeneous coating film of a three-dimensionally ordered lattice of specific spherical fine particles, specifically, a coating film of a three-dimensionally ordered lattice of specific spherical fine particles exhibiting ultraviolet ray reflection properties under irradiation with ultraviolet rays having a wavelength of not more than 400 nm.

That is to say, a suspension (S-3) comprising, as a dispersoid, organic or inorganic polymer monodisperse specific spherical fine particles having a mean volume diameter (d) of a specific range of 10 to 130 nm, and as a dispersion medium, an aqueous solution or a dissolving water-containing non-aqueous solution, wherein the dispersion concentration of the dispersoid, as expressed on the volume basis, is not less than 20% and not more than 70%, and the electrical conductivity of the solid-liquid dispersion is not more than 2000 μS/cm, is prepared.

Then, the suspension (S-3) is applied as a coating liquid onto a plate selected from a glass plate, a plastic plate, a steel plate, an aluminum plate, a stainless steel plate, a ceramic plate, a wood plate and a fabric sheet to form a green sheet of the suspension (S-3).

Subsequently, the green sheet is exposed to an atmosphere having a temperature exceeding a freezing point of the dispersion medium to dry it and thereby form a three-dimensionally ordered lattice of specific spherical fine particles regularly aligned longitudinally and laterally on the plate.

Then, any one of a polymerizable organic monomer solution, an organic polymer solution and an inorganic binder solution, a refractive index (nB) of a polymer or a cured product obtained from said solution being different from a refractive index (nP) of the spherical fine particles, is applied or sprayed so as to fill a surface of the three-dimensionally ordered lattice and gaps among the three-dimensionally aligned particles, followed by polymerization or curing to fix, as a coating film, the three-dimensionally ordered lattice of spherical fine particles exhibiting ultraviolet ray reflection properties under irradiation with ultraviolet rays having a wavelength of not more than 400 nm. As a result, an ultraviolet ray reflecting coating film of a three-dimensionally ordered lattice of spherical fine particles is obtained.

According to the present invention, further, the suspension (A-4) obtained by the "fourth production process" for producing a three-dimensionally ordered lattice of spherical fine particles is applied as a coating liquid onto a plate to obtain a homogeneous coating film of a three-dimensionally ordered lattice of specific spherical fine particles, specifically, a coating film of a three-dimensionally ordered lattice of spherical fine particles exhibiting infrared ray reflection properties under irradiation with infrared rays having a wavelength of not less than 800 nm.

That is to say, a suspension (S-4) comprising, as a dispersoid, organic or inorganic polymer monodisperse spherical fine particles having a mean volume diameter (d) of 350 to 800 nm, and as a dispersion medium, an aqueous solution or a dissolving water-containing non-aqueous solution, wherein the dispersion concentration of the dispersoid, as expressed on the volume basis, is not less than 20% and not more than 70%, and the electrical conductivity of the solid-liquid dispersion is not more than 2000 μS/cm, is prepared.

Then, the suspension (S-4) is applied as a coating liquid onto a plate selected from a glass plate, a plastic plate, a steel plate, an aluminum plate, a stainless steel plate, a ceramic plate, a wood plate and a fabric sheet to form a green sheet of the suspension (S-4).

Subsequently, the green sheet is exposed to an atmosphere having a temperature exceeding a freezing point of the dispersion medium to dry it and thereby form a three-dimensionally ordered lattice of specific spherical fine particles regularly aligned longitudinally and laterally on the plate.

Then, any one of a polymerizable organic monomer solution, an organic polymer solution and an inorganic binder solution, a refractive index (nB) of a polymer or a cured product obtained from said solution being different from a refractive index (nP) of the spherical fine particles, is applied or sprayed so as to fill a surface of the three-dimensionally ordered lattice and gaps among the three-dimensionally aligned particles, followed by polymerization or curing to fix, as a coating film, the three-dimensionally ordered lattice of spherical fine particles exhibiting infrared ray reflection properties under irradiation with infrared rays having a wavelength of 800 to 1500 nm. As a result, an infrared ray reflecting coating film of a three-dimensionally ordered lattice of specific spherical fine particles is obtained.

As described above, there are provided by the invention the "first production process" for producing a three-dimensionally ordered lattice of spherical fine particles in which a particle array structure constituted of three-dimensionally aligned spherical fine particles is stably fixed as an extremely homogeneous structure, the "second production process" for producing a chromatic color-developing three-dimensionally ordered lattice in which the spherical fine particles are specific black color type achromatic color spherical fine particles having a mean volume diameter of 130 to 350 nm, the "third production process" for producing an ultraviolet ray reflecting three-dimensionally ordered lattice in which the spherical fine particles are specific spherical fine particles having a mean volume diameter of 10 to 130 nm, and the "fourth production process" for producing an infrared ray reflecting three-dimensionally ordered lattice in which the spherical fine particles are specific spherical fine particles having a mean volume diameter of 350 to 800 nm. According to the studies of the present inventors, the solid-liquid suspension prepared in any of the above processes is used as a coating liquid, then the coating liquid is applied onto a plate selected from various kinds of plates to form a green sheet, the green sheet is dried to form a three-dimensionally ordered lattice of spherical fine particles having a homogeneous particle array structure and having a flat surface on the plate, and then the three-dimensionally ordered lattice is sealed with a binder without impairing the particle array structure, whereby a homogeneous coating film can be formed.

By observing a SEM photograph of a dry type ordered structure that is a dried product of the colloidal crystals of the invention comprising monodisperse dispersoid spherical particles, it is confirmed that in the colloidal crystals (solid-liquid colloidal dispersion) as a precursor before drying, spherical colloidal particles (dispersoid) are regularly aligned in a lattice form to obviously form a novel three-dimensionally ordered lattice. This dispersion is a solid-liquid colloidal dispersion which readily flows longitudinally and laterally by an external stress, and when the dispersion is allowed to stand still, the colloidal particles form a homogeneous three-dimensionally ordered lattice as a particle array structure. In the formation of the stable lattice-like solid-liquid ordered structure from the dispersoid colloidal particles, the dispersoid spherical colloidal particles are regularly aligned longitudinally and laterally in the solid-liquid colloidal dispersion system while an interparticle distance (L) defined as a distance between centers of the particles arranged opposite to each other along the center line satisfies the relationship $(d)<(L)\leqq(d)+2(\Delta e)$.

In the present invention, in order to obtain such an interparticle distance (L), ionic species and an electrolyte scattered or floating in the dispersion medium solution of the solid-liquid colloidal dispersion are reduced by dialysis or the like, and as a result, counter ionic species of the electrostatically chargeable colloidal particles dispersed in the solid-liquid colloidal dispersion are fixed to form an electric double layer ($\Delta e$) of a given thickness ($\Delta e$) on the surfaces of the chargeable colloidal particles. In the present invention, therefore, in addition to the counter ions fixed to the particle surfaces, counter ionic species and counter electrolyte liable to be scattered or liable to float are reduced or removed, whereby the chargeable colloidal particles of the dispersoid maintain the interparticle distance (L) to effectively prevent longitudinal and lateral random alignment of particles.

In the present invention, an electric double layer that is present in the vicinity of the electric double layer ($\Delta e$) and liable to be scattered is reduced or removed together with the floating electrolyte by means of desalting through dialysis or the like, and as a result, an intensity of the surface charge of the spherical fine particles of colloidal particle size in the solid-liquid dispersion is relatively enhanced. By virtue of enhancement of the surface charge intensity, the electric double layer of a given thickness ($\Delta e$) formed as a counter ion on the particle surface is attracted by the colloidal particles to further increase a charge density and thereby further stabilize the interparticle distance (L) between the dispersoid colloidal particles. That is to say, a repulsion force to counteract particle aggregation direction due to the van der Waals force acting between particles is balanced, and the prescribed interparticle distance in the longitudinal and lateral directions is stabilized.

In the present invention, it is difficult to actually measure the thickness ($\Delta e$) of the electric double layer formed in the case where the interparticle distance (L) defined as a distance between centers of the particles arranged opposite to each other along the center line on the ordered structure plane in the solid-liquid colloidal dispersion satisfies the relationship $(d)<(L)\leqq(d)+2(\Delta e)$, but as indicated in the later-described working examples, when the electrical conductivity of the solid-liquid colloidal dispersion after dialysis treatment is held constant, the following fact is perceived. That is to say, as the dispersoid colloidal particles have higher surface electrostatic charging degree, the relationship $(d)<(L)\leqq(d)+2(\Delta e)$ is more smoothly satisfied and the particles are more regularly aligned longitudinally and laterally to form a particle array structure wherein the particles are three-dimensionally aligned in a lattice form. It can be said that such a particle array structure constitutes colloidal particle crystals formed as a solid-liquid dispersion.

As described above, the solid-liquid dispersion containing three-dimensionally regularly aligned colloidal particles readily flows under application of a slight external stress with substantially maintaining the three-dimensional lattice form, and it readily forms colloidal crystals again as the three-dimensional lattice form of the colloidal particles when allowed to stand still.

In the first to the fourth production processes of the invention to form an extremely homogeneous three-dimensionally ordered lattice as a particle array structure in which monodisperse spherical fine particles are aligned, it is a very important requirement to prepare, as the solid-liquid dispersion containing spherical fine particles dispersed as a dispersoid, a solid-liquid suspension having an electrical conductivity of not more than 2000 μS/cm and having a dispersoid concentration, as expressed on the volume basis, of 20 to 70%, in order to form an extremely homogeneous three-dimensionally ordered lattice. The "homogeneity" of the particle array structure as the three-dimensionally ordered lattice of spherical fine particles is better understood by observing SEM photographs shown in FIG. 1 and FIG. 2 of the attached drawings.

(1) The SEM photograph of FIG. 1 shows a surface of the three-dimensionally ordered lattice of monodisperse spherical fine particles obtained by the present invention. Explaining crystallographically, a particle array image of a [001] plane (lattice plane of particle array structure, (hkl) plane of Miller's indices) of the ordered structure in the c-axis direction [001] is shown. As can be seen from the SEM photograph, an extremely homogeneous regular particle array is formed.

(2) The SEM photograph of FIG. 2 shows a vertical section (vertical to the surface) of the three-dimensionally ordered lattice of monodisperse spherical fine particles obtained by the present invention. Similarly, a particle array image of a [100] plane ([hkl] plane) or a [010] plane ([hkl] plane) of the ordered structure in the a-axis direction [100] or the b-axis direction [010] is shown. As can be seen from the SEM photograph, an extremely homogeneous regular particle laminate is obviously formed.

In the lamination of the [001] plane of the ordered structure in the c-axis direction [001], the monodisperse spherical fine particles are phase shifted in the a-axis direction [100] and the b-axis direction [010] by [½·(d)] that is a radius of the spherical fine particle to form a [001] plane of an ordered structure, and the [001] plane is successively laminated. As a result, it can be said that the three-dimensionally ordered lattice obtained by the invention tends to be a three-dimensionally ordered lattice of a simple orthorhombic system which is formed by oblique shifting of the [001] plane of the ordered structure by a distance corresponding to [½·(d)] in the a-axis and the b-axis directions, though the [001] plane is laminated in the c-axis direction crystallographically.

Thus, the three-dimensionally ordered lattice of spherical fine particles produced by the invention is a three-dimensionally ordered lattice wherein the [001] plane shown in FIG. 1 is regularly laminated in the [001] direction that is a vertical direction, and is a three-dimensionally ordered lattice that is extremely homogeneous as a particle array structure.

That is to say, in the production process of the invention, the solid-liquid suspension prepared through the steps of "optimization of electrostatic charge of solid-liquid dispersion" and "optimization of dispersion concentration of dispersoid monodisperse spherical particles" is dried at a low temperature of about room temperature that is not higher than a boiling point of the dispersion medium while allowing the suspension to stand still, whereby a three-dimensionally ordered lattice that is extremely homogeneous as a particle array structure is formed. Around the spherical fine particles dispersed as a dispersoid in the above-prepared solid-liquid suspension and electrostatically charged at an electrical conductivity as low as possible, a dispersion medium of counter electrostatic charge is fixed to form an electric double layer. As a result, in the three-dimensionally ordered lattice formed from fine particles having a particle size of not more than 30 μm, particularly colloidal particles having a particle size of 10 nm to 3 μm, there is no fear of occurrence of dry shrinkage cracks, greatly differently from the conventional dry process, and besides, any different particle array is not present on the surface of the particle laminate and/or in the particle laminate. Therefore, a three-dimensionally ordered lattice of high homogeneity and structurally high purity can be produced by a relatively simple and easy process with effectively preventing formation of a heterogeneous ordered structure.

Further, because the three-dimensionally ordered lattice is homogeneous as a particle array structure and is one wherein the [001] plane that is a surface of the ordered structure is regularly laminated in the [001] direction that is the c-axis direction (vertical direction), it exhibits excellent surface properties. For example, attributably to the aforesaid specific spherical particles, under irradiation with visible rays and ultraviolet rays, the homogeneity of the particle array structure reduces or prevents indefinite light direction caused by scattering, and the interference effect is efficiently strengthened, so that extremely definite reflection properties are exhibited (see FIG. 3 to FIG. 6). Accordingly, in addition to the above properties of the specific fine particles, the three-dimensionally ordered lattice clearly exhibits properties of spherical fine particles containing or modified with various functional agents or functional groups having magnetizing properties, charging properties, adsorption properties, ion-exchange properties, chemical reactivity, etc., as structural properties of the extremely homogeneous particle array structure.

BEST MODE FOR CARRYING OUT THE INVENTION

Figure 1:
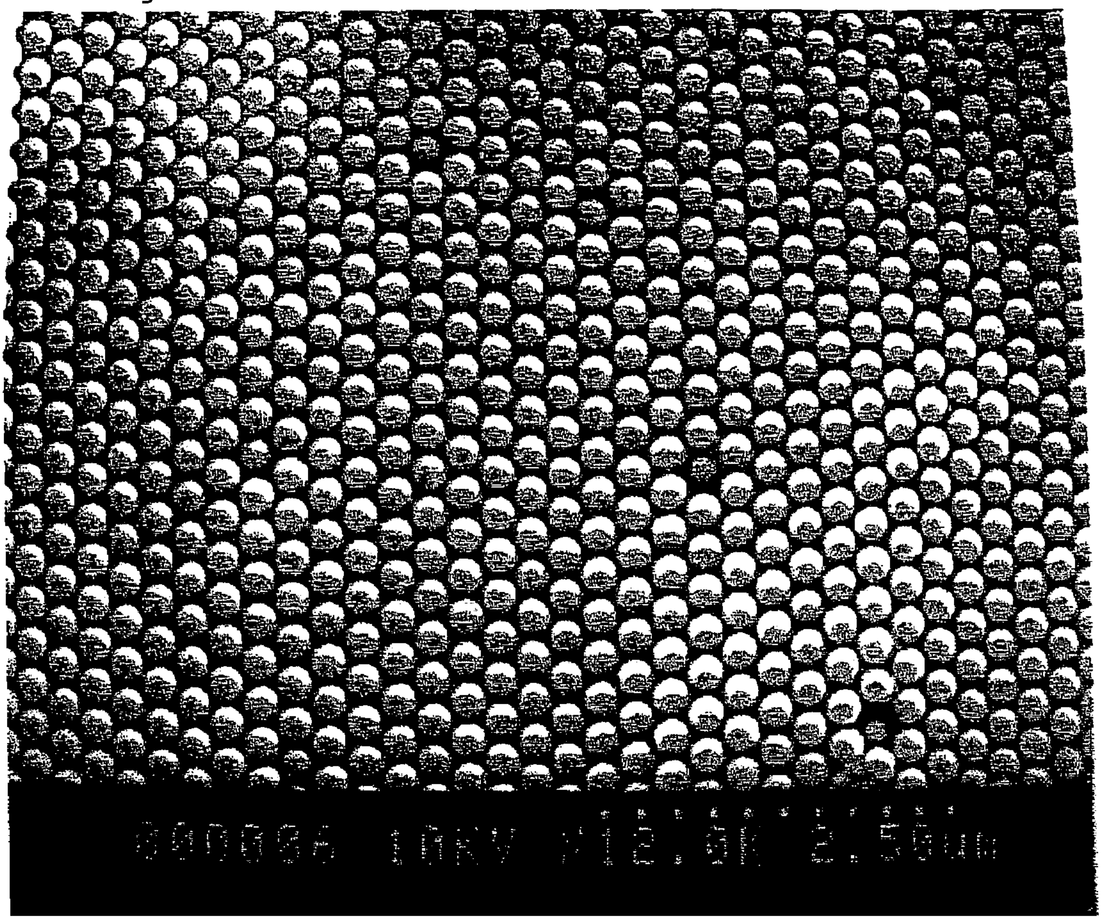
FIG. 1 is a SEM photograph showing a particle array structure of a surface of a three-dimensionally ordered lattice of spherical fine particles produced by the present invention.
Figure 2:
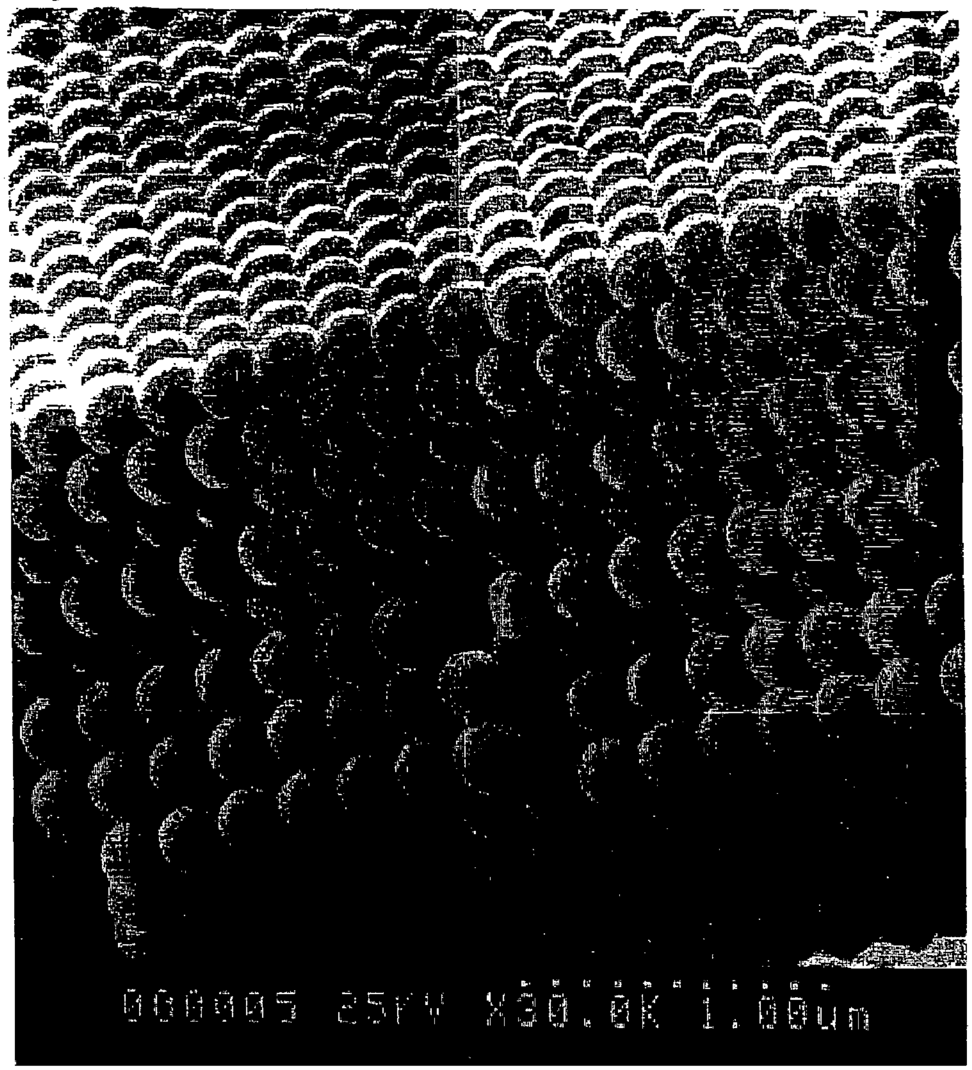
FIG. 2 is a SEM photograph showing a particle array structure of a vertical section (vertical to the surface) of a three-dimensionally ordered lattice of spherical fine particles produced by the present invention.

The colloidal crystals of the invention and the process for producing a three-dimensionally ordered lattice of monodisperse spherical fine particles using the colloidal crystals are further described with reference to the best mode for carrying out them.

The fluid colloidal crystals of the invention are obtained as a solid-colloidal dispersion wherein chargeable colloidal spherical particles having an electrostatic charging degree of not more than 2000 μS/cm in terms of an electrical conductivity are contained in a dispersion concentration, as expressed on the volume basis, of not less than 20% and not more than 70%.

The solid-liquid colloidal dispersion is formed from the dispersoid chargeable colloidal particles and as a dispersion medium an aqueous or dissolving water-containing non-aqueous solution containing counter ionic species and counter electrolyte to the particle surface charge, and comprises novel colloidal crystals having fluidity as a lattice-like particle structure constituted of three-dimensionally aligned particles. The electrical conductivity is usually not more than 2000 μS/cm, preferably not more than 1000 μS/cm, more preferably not more than 500 μS/cm, and the lower limit of the electrical conductivity is usually 100 μS/cm. Even if the lower limit is less than 100 μS/cm, economical cost increase is only brought about.

That is to say, the colloidal crystals of the dispersion comprising, as a dispersoid, electrostaically chargeable spherical colloidal particles made of an organic or inorganic polymer and having a mean volume diameter (d) of not more than several thousands nm, and as a dispersion medium, an aqueous or dissolving water-containing non-aqueous solution containing counter ionic species and counter electrolyte to the ions of the dispersoid chargeable colloidal spherical particles.

In the solid-liquid colloidal dispersion, around the dispersoid spherical colloidal particles aligned, an electric double layer of a given thickness (Δe) is formed at a temperature of not lower than the freezing point of the dispersion medium solution, and the dispersoid chargeable spherical colloidal particles are regularly aligned longitudinally and laterally while an interparticle distance (L) defined as a distance between centers of the particles arranged opposite to each other along the center line satisfies the relationship $(d)<(L)\leqq(d)+2(\Delta e)$ From a scanning electron microscope photograph of the colloidal particles, it is observed that the electrostatically chargeable colloidal particles are longitudinally and laterally aligned in a homogeneous lattice form without forming any different particle array in any of the longitudinal and lateral directions.

In the present invention, the colloidal particles constituting the fluid colloidal crystals for forming the homogeneous three-dimensionally ordered lattice are specific spherical colloidal particles having a mean volume diameter (d) of 130 to 350 nm, and they are made of an organic or inorganic polymer of one black color type achromatic color selected from grayish white, gray, grayish black and black. Particularly in the invention, the colloidal particles are preferably monodisperse specific spherical colloidal particles, and in this case, the colloidal particles form chromatic color-developing colloidal crystals which develop, as structural properties of the fluid colloidal crystals, a clear spectral color under irradiation with visible light such as natural light or white light according to the interparticle distance (L) of the three-dimensionally ordered lattice. The exhibition of such extremely clear optical properties based on the reflection spectrum means that the chargeable colloidal particles are regularly aligned in a homogeneous lattice form in the solid-liquid colloidal dispersion or that a black color type achromatic three-dimensionally ordered lattice containing no group of particles arranged at random longitudinally and laterally is formed.

According to the present invention, the colloidal crystals which undergo chromatic color development as optical properties have the same optical properties as those of the conventional structural color-developing materials with regard to the optical color developing properties.

However, the ordered structure as a particle structure is significantly different in that it is an ordered structure formed in a solid-liquid colloidal dispersion. Moreover, in the ordered structure, colloidal particles are so aligned in a homogeneous lattice form that they might be called colloidal single crystals in connection with the interparticle distance (L) in the solid-liquid colloidal dispersion, as previously described, and such an ordered structure is an ordered structure of high purity rarely including a different aligned particle plane.

The fluid colloidal crystals of the invention are formed as a solid-liquid colloidal dispersion, so that the concept is greatly different from the concept of conventional crystal growth. Further, the crystal density of the solid-liquid colloidal dispersion ranges widely, and not only increase of the thickness of the crystal layer in the longitudinal direction but also formation of crystals (or growth of crystals) in the lateral direction can be readily carried out.

The colloidal particles, which are dispersed as a dispersoid and aligned in the solid-liquid colloidal dispersion to form colloidal single crystals, are preferably colloidal particles of a black color type achromatic color selected from grayish white, gray, grayish black and black from the viewpoint of optical color-developing properties of the crystals similarly to the conventional structural color-developing materials. That is to say, the colloidal single crystals of the invention as a solid-liquid colloidal dispersion do not have any different lattice plane in the particle array, so that the surface of the ordered structure properly and effectively absorbs or reduces stray light other than the reflected light emitted around the particles, said stray light being attributable to scattering or transmission of a part of applied visible light. In the present invention, the colloidal particles are preferably those having a colorless achromatic color having a saturation of not more than 5, preferably not more than 3, because the reflected light color as optical properties can be made clearer. In the invention, therefore, the colloidal particles are more preferably organic or inorganic polymer spherical particles of a black color type achromatic color selected from grayish white, gray, grayish black and black whose saturation is almost 0.

In the present invention, further, in order that the dispersoid organic or inorganic polymer particles are present as colloidal particles in the solid-liquid colloidal dispersion, the particle diameter is in the range of usually 0.01 to 30 μm, preferably 0.01 to 3 μm. From the viewpoint of clear exhibition of optical properties, such as reflection, absorption and transmission of light in the visible light wavelength region (380 to 780 nm), the colloidal particles are preferably organic or inorganic polymer particles having a mean volume diameter (d) of not more than 350 nm, preferably not more than 330 nm, particularly preferably not more than 300 nm. From the viewpoints of dispersibility in the solid-liquid colloidal dispersion, charging properties of the spherical colloidal particle surfaces and alignment, preferable are particles having a particle diameter of 120 nm as a lower limit and a particle diameter of 380 nm as an upper limit, and more preferable are particles having a mean volume diameter (d) of 130 to 350 nm, preferably 150 to 300 nm. With regard to the reflection in the ultraviolet wavelength region (not more than 380 nm), the mean volume diameter (d) is preferably not more than 130 nm, more preferably 10 to 120 nm. With regard to the reflection in the infrared wavelength region (800 to 1500 nm), the mean volume diameter (d) is preferably not less than 340 nm, more preferably not less than 350 nm, still more preferably 380 to 800 nm.

For the aforesaid reason, the solid-liquid colloidal dispersion in the invention has a dispersion concentration, as expressed on the volume basis, of not more than 70% in connection with the interparticle distance (L) of the dispersoid spherical colloidal particles in the dispersion. If the dispersion concentration of the dispersoid in the dispersion is less than 10%, it becomes very difficult to align the particles in a constant array and to stabilize the array. If the concentration exceeds the upper limit of the above range, groups of particles aggregated at random are liable to occur, and regular alignment of the particles tends to be markedly inhibited, so that such a concentration is undesirable. From the view points of packaging degree, stability and purity of the colloidal crystals of the invention comprising the solid-liquid colloidal dispersion, the concentration is preferably not less than 20% and not more than 60%, more preferably not less than 25% and not more than 55%, particularly preferably not less than 35% and not more than 50%. When the concentration is in this range, the colloidal crystals of the invention (i.e., solid-liquid colloidal dispersion) are excellent in purity, stability, clearness of various properties exhibited, handling properties and fluidity.

In order to form a homogeneous three-dimensionally ordered lattice in the solid-liquid colloidal dispersion, it is preferable that the dispersoid spherical colloidal particles are present in the pH dispersion region of a non-isoelectric point. Explaining with regard to "isoelectric point—pH", it is presumed that at the isoelectric point, namely, pH neutral point, the chargeable colloidal particles having counter ions have difficulty in forming the interparticle distance (L) specified by the invention with holding an electric double layer of a given thickness (Δe), though the details are not clear.

In the present invention, surface charging degree of the dispersoid colloidal particles in the solid-liquid colloidal dispersion, that is, charging property of the solid-liquid colloidal dispersion, is important, as previously described. As the surface charging degree of the organic or inorganic polymer particles, an absolute value (measured by a blow-off method) of (+) or (−) surface charge of the particle that is electrostatically charged by adsorbed ions having, as an adsorption active site, a site of a functional group contained in the polymer is preferably in the range of 50 to 500 μC/g. Examples of such functional groups include acid or basic functional groups, such as carboxyl group (—COOH), sulfonic group (—$SO_3H$), hydroxyl group (—OH), amino group (—$NH_2$) and amide group (—$CONH_2$), alkenes (—CH═CH—), alkynes (—C≡C—), vinyl ethers (—CH═CH—O—), nitrile group (—C≡N), isocyanate group (—N═C═O), nitro group, thiol group (—SH), and —$CF_3$ group.

In order to form an ordered structure of high purity in the solid-liquid colloidal dispersion of the invention, the spherical colloidal particles of the organic or inorganic polymer are preferably monodisperse particles having a Cv value, which indicates a uniformity ratio of the mean volume diameter, of preferably not more than 5%, more preferably 3%. Also from the viewpoint of optical properties, the organic or inorganic spherical particles are preferably monodisperse particles because the reflection efficiency given when applied visible rays are reflected by diffraction interference on the colloidal crystal plane has influence on the color developed by the optical color-developing material. The Cv value that indicates a uniformity ratio of the particle diameter and indicates monodisperse property is preferably not more than 5%, and from the viewpoints of density and clearness of a reflected light color, it is more preferably not more than 3%.

The colloidal crystals as the solid-liquid colloidal dispersion having the above features have optical properties such that the monodisperse spherical particles of a black color type achromatic color dispersed and aligned as an ordered structure in a lattice form in the dispersion develop a clear monochromatic color under irradiation with natural light or white light, in connection with the interparticle distance (L) defined as a distance between centers of the particles arranged opposite to each other along the center line in the dispersion, as previously described. That is to say, they develop spectral colors, such as purple color, blue in the following (I) to (V). The chromatic spectral colors visually sensed, which are vertical color appearances on the colloidal crystal plane, are as follows:

(I) when (L) is in the range of 160 to 170 nm, the chromatic color developed is purple (P), (II) when (L) is in the range of 180 to 195 nm, the chromatic color developed is blue (B), (III) when (L) is in the range of 200 to 230 nm, the chromatic color developed is green (G), (IV) when (L) is in the range of 240 to 260 nm, the chromatic color developed is yellow (Y), and (V) when (L) is in the range of 270 to 290 nm, the chromatic color developed is red (R).

That is to say, the fluid colloidal crystals can undergo spectral color development in connection with the inerparticle distance (L).

In the present invention, the fluid colloidal crystals can properly form a crystal layer having a thickness of not less than 200 nm, preferably not less than 400 nm, making the best use of the aforesaid features of the solid-liquid colloidal dispersion.

In the present invention, the organic polymer monodisperse spherical colloidal particles are not necessarily restricted, but they are preferably spherical particles of at least one organic polymer selected from (meth)acrylic polymers, (meth)acrylic-styrene polymers, fluorine substituted (meth) acrylic polymers and fluorine substituted (meth)acrylic-styrene polymers. Likewise, the inorganic polymer monodisperse spherical particles are not necessarily restricted, but they are preferably spherical particles of at least one inorganic polymer selected from silica, alumina, silica-alumina, titania and titania-silica. In the present invention, it is an important feature that any of the organic or inorganic polymer particles are colloidal particles of a black color type achromatic color of gray to black having been colored with a dye or a pigment and they are monodisperse spherical particles. It is also important that the colloidal particles having such a feature can be properly prepared as chargeable colloidal particles in the solid-liquid colloidal dispersion.

Examples of the organic polymers for the organic polymer monodisperse spherical particles used in the solid-liquid colloidal dispersion having the above feature include polymethyl (meth)acrylate, tetrafluoroethylene, poly-4-methyl-1-pentene, polybenzyl(meth)acryalte, polyphenylene methacrylate, polycyclohexyl(meth)acrylate, polyethylene terephthalate, polystyrene, styrene/acrylonitrile copolymer, polyvinyl chloride, polyvinylidene chloride, polyvinyl acetate, polyvinyl alcohol and polyurethane, though the polymer employable is not limited to these examples. As previously described, under irradiation with natural light such as sunlight or white light, the reflected light color of the optical color-developing material is visually sensed according to the light of the visible wavelength region, so that from the viewpoint of excellent light resistance, the polymer resin preferably used in the invention is an acrylic type organic polymer selected from (meth)acrylic polymers, (meth)acrylic-styrene polymers, fluorine substituted (meth)acrylic polymers and fluorine substituted (meth)acrylic-styrene polymers having excellent weathering resistance.

Examples of monomers for the electrostatically chargeable acrylic resins include alkyl(meth)acrylates, such as methyl (meth)acrylate, ethyl(meth)acrylate, propyl(meth)acrylate, isopropyl(meth)acrylate, butyl(meth)acrylate, isobutyl (meth)acrylate, pentyl(meth)acrylate, hexyl(meth)acrylate, 2-ethylhexyl(meth)acrylate, octyl(meth)acrylate, lauryl (meth)acrylate, nonyl(meth)acrylate, decyl(meth)acrylate, dodecyl(meth)acrylate, phenyl(meth)acrylate, methoxyethyl (meth)acrylate, ethoxyethyl(meth)acrylate, propoxyethyl (meth)acrylate and butoxyethyl(meth)acrylate; dialkylaminoalkyl(meth)acrylates, such as diethylaminoethyl(meth) acrylate, (meth)acrylamides, such as (meth)acrylamide, N-methylol(meth)acrylamide and diacetone acrylamide, and glycidyl(meth)acryalte; and dimethacrylic acid ester of ethylene glycol, dimethacrylic acid ester of diethylene glycol, dimethacrylic acid ester of triethylene glycol, diacrylic acid ester of polyethylene glycol, dimethacrylic acid ester of propylene glycol, dimethacrylic acid ester of dipropylene glycol, and dimethacrylic acid ester of tripropylene glycol. Examples of other monomers than the above-mentioned (meth)acrylic monomers include styrene; alkylstyrenes, such as methylstyrene, dimethylstyrene, trimethylstyrene, ethylstyrene, diethylstyrene, triethylstyrene, propylstyrene, butylstyrene, hexylstyrene, heptylstyrene and octylstyrene; halogenated styrenes, such as fluorostyrene, chlorostyrene, bromostyrene, dibromostyrene and chloromethylstyrene; and styrene monomers, such as nitrostyrene, acetylstyrene, methoxystyrene, α-methylstyrene and vinyltoluene. Examples of monomers other than the styrene monomers include silicon-containing vinyl monomers, such as vinyltrimethoxysilane and vinyltriethoxysilane; vinyl esters, such as vinyl acetate, vinyl propionate, vinyl n-butyrate, vinyl isobutyrate, vinyl pivalate, vinyl caproate, vinyl versatate, vinyl laurate, vinyl stearate, vinyl benzoate, vinyl p-t-butylbenzoate and vinyl salicylate; vinylidene chloride and vinyl chlorohexanecarboxylate. Further, the following monomers are also employable when needed. Examples of monomers having functional group include unsaturated carboxylic acids, such as acrylic acid, methacrylic acid, tetrahydrophthalic acid, itaconic acid, citraconic acid, crotonic acid, isocrotonic acid, nornenedicarboxylic acid and bicyclo[2,2,1]hept-2-ene-5,6-dicarboxylic acid, and examples of their derivatives include maleic anhydride, itaconic anhydride, citraconic anhydride and tetrahydrophthalic anhydride. Examples of polymerizable reactive monomers having hydroxyl group (OH) include 2-hydroxyethyl acrylate, 2-hydroxyethyl methacrylate, 2-hydroxypropyl acrylate, 1,1,1-trihydroxymethylethane triacrylate, 1,1,1-trishydroxymethylmethylethane triacrylate, 1,1,1-trishydroxymethylpropane triacrylate; hydroxyalkyl vinyl ethers, such as hydroxyvinyl ether, hydroxypropyl vinyl ether and hydroxybutyl vinyl ether; and hydroxyalkyl(meth)acrylates, such as 2-hydroxyethyl(meth)acrylate, 2-hydroxypropyl acrylate and diethylene glycol mono(meth)acrylate. These monomers can be appropriately used singly or in combination of two or more kinds. Examples of (meth)acrylic acid monomers partially or wholly substituted with fluorine include fluorine substituted (meth)acrylic acid monomers (or fluoro(meth)alkyl acrylates), such as trifluoromethylmethyl (meth)acrylate, 2-trifluoromethylethyl(meth)acrylate, 2-perfluoromethylethyl(meth)acrylate, 2-perfluoroethyl-2 -perfluorobutylethyl(meth)acryalte, 2-perfluoroethyl(meth) acrylate, perfluoromethyl(meth)acrylate and diperfluoromethylmethyl(meth)acrylate. Examples of fluoroolefins include fluoroethylene, vinylidene fluoride, tetrafluoroethylene, hexafluoroethylene, hexafluoropropylene and perfluoro-2,2-dimethyl-1,3-dioxole. In the present invention, homopolymers of these monomers or copolymers of these monomers and other polymerizable monomers are employable.

To the monodisperse spherical particles (including spherical monodisperse particles of a black color type achromatic color) used in the invention, additives, such as ultraviolet absorbing agent, antioxidant, fluorescent, charging agent, antistatic agent, dispersion stabilizer and anti-foaming agent, can be properly added when needed. As other additives, functional agents or functional groups having various properties, such as magnetizing properties, charging properties, absorption properties, ion-exchange properties and chemical reactivity, can be contained in the particles, or the surfaces of the particles can be modified with these additives, so long as sphericity of the resulting dispersoid particles, monodisperse property thereof and dispersibility in a suspension are not impaired.

The organic polymer monodisperse spherical fine particles of a black color type achromatic color for preparing fluid colloidal crystals of the invention as the solid-liquid colloidal dispersion having the above features can be usually prepared by processes generally used, such as soap-free emulsion polymerization, emulsion polymerization, seed polymerization, swell polymerization and dispersion polymerization.

In the soap-free emulsion polymerization, a persulfuric acid salt such as potassium persulfate or ammonium persulfate is usually used as a polymerization initiator, and the polymerization initiator has only to be soluble in an aqueous medium when polymerization is performed. The polymerization initiator is used in an amount of usually 0.1 to 10 parts by weight, preferably 0.2 to 2 parts by weight, based on 100 parts by weight of the monomer to be polymerized. In the emulsion polymerization, an emulsifying agent is used. Examples of the emulsifying agents include alkylbenzenesulfonic acid salts, such as sodium dodecylbenzenesulfonate, and polyethylene glycol alkyl ethers, such as polyethylene glycol nonylphenyl ether. The emulsifying agent is used in an amount of usually 0.01 to 5 parts by weight, preferably 0.1 to 2 parts by weight, based on 100 parts by weight of the monomer to be polymerized. The emulsifying agent is mixed with an aqueous medium to form an emulsion, and to the emulsion, a polymerization initiator, e.g., persulfuric acid salt such as potassium persulfate or ammonium persulfate, is added in an amount of 0.1 to 10 parts by weight, preferably 0.2 to 2 parts by weight, based on 100 parts by weight of the monomer to be polymerized. In any of the seed polymerization, the swell polymerization, the dispersion polymerization and the suspension polymerization, the emulsifying agent used is not specifically restricted, and surface active agents usually used, such as anionic surface active agents, cationic surface active agents and nonionic surface active agents, may be used singly or in combination. Examples of the anionic surface active agents include dodecylbensenesulfonate, dodecylbenzenesulfonate, undecylbenzenesulfonate, tridecylbenzenesulfonate, nonylbenzenesulfonate, sodium salts thereof and potassium salts thereof. Examples of the cationic surface active agents include cetyltrimethylammonium bromide, hexadecylpyridinium chloride and hexadecyltrimethylammonium chloride. The nonionic surface active agent is, for example, pyridinium. Examples of reactive emulsifying agents (e.g., emulsifying agents having polymerizable group such as acryloyl group or methacryloyl group) include anionic, cationic or nonionic reactive emulsifying agents, and such reactive emulsifying agents are used without any restriction. In order to allow the resin particles used in the invention to have a black type color, an oil-soluble black color type dye or a carbon black-containing black color type pigment is appropriately dispersed or suspended as a color material in a mixture of a polymerizable monomer, an emulsifying agent and water.

More specifically, to a system containing 100 parts by weight of a monomer selected from the aforesaid polymerizable monomers and 200 to 350 parts by weight of water, 5 to 10 parts by weight of a black color type dye, such as C.I. Solvent Black 27, are added, and they are heated with stirring. Then, 0.05 to 0.7 part by weight of an emulsifying agent is added, and they are sufficiently stirred and mixed. Thereafter, the system is purged with nitrogen, and the mixture is heated to a temperature of 60 to 80° C. with stirring. Then, 0.3 to 0.6 part by weight of a polymerization initiator such as potassium persulfate is added, and polymerization reaction is performed at 70 to 90° C. for 4 to 8 hours. In the reaction dispersion obtained in this soap-free emulsion polymerization, monodisperse black spherical polymer particles having a mean volume diameter (d) of 50 to 900 nm are prepared in a solids concentration of 10 to 35% by weight.

In the present invention, instead of the organic polymer colloidal particles, inorganic polymer monodisperse spherical particles of a black color type achromatic color can be properly used for forming the colloidal crystals. Examples of the inorganic polymers include silica, alumina, silica-alumina, zirconia, titania, titania-silica, silicon carbide and silicon nitride, though the inorganic polymer employable in the invention is not limited to these examples. Particularly, inorganic polymer particles prepared by a sol-gel process of an alkoxide of a metal such as silica, aluminum or titanium are preferably used because they are relatively easily colored a black color type achromatic color with a dye or a pigment. Examples of the metallic alkoxides include methyltrimethoxysilane, vinyltrimethoxysilane, tetraethyl silicate, tetraisopropyl silicate, tetrabutyl silicate, aluminum ethoxide, aluminum triethoxide, isobutylaluminum methoxide, isobutylaluminum ethoxide, aluminum isopropoxide, isobutylaluminum isopropoxide, aluminum butoxide, aluminum t-butoxide, tin t-butoxide, aluminum tri-n-propoxide, aluminum tri-n-butoxide, tetraethoxytitanium, tetra-n-propoxytitanium, tetra-n-butoxytitanium, tetra-1-propoxytitanium, titanium methoxide, titanium ethoxide, titanium n-propoxide, titanium isopropoxide, titanium n-butoxide, titanium isobutoxide, zirconium ethoxide, zirconium n-propoxide, zirconium isopropoxide, zirconium n-butoxide and tetra-n-propoxyzirconium ethoxide.

In the present invention, the above-prepared suspension in which the organic or inorganic polymer colloidal particles of a black color type achromatic color are dispersed as a dispersoid is filtered when needed, and then the suspension is subjected to dialysis in a usual way to adjust the electrolyte concentration in the suspension to not more than 600 μS/cm, preferably 50 to 500 μS/cm, in terms of an electrical conductivity (μS/cm). Then, the resulting slurry can be concentrated to a dispersion concentration of not more than 70%, preferably not more than 60%, in terms of a volume concentration of the dispersoid colloidal particles, as previously described.

The colloidal crystals of the invention provided as the solid-liquid colloidal dispersion containing colloidal particles can be formed by enclosing the above suspension between transparent members facing each other and having a gap of for example not less than 400 nm therebetween in such a manner that the gap (crystal layer thickness) is kept constant, without restricting an occupied area of the members in the plane direction. Examples of the transparent members include flexible plastic films, rigid plastic films and glass plates. By enclosing the suspension between these transparent members, colloidal crystals are formed. Making the best use of the features of the solid-liquid colloidal dispersion, the suspension can be enclosed in a transparent member having a shape other than the above-mentioned plane, such as a double cylindrical member, a double polygonal member, a double spherical member, a flexible fine tubular member or a hollow tubular member for optical fibers, whereby colloidal crystals are formed.

In the present invention, usual organic polymer sheets having flexibility can be used without any restriction, provided that they have water resistance or solvent resistance because the suspension is enclosed. Particularly when a transparent sheet is desired, there can be used, for example, polyesters, such as polyethylene terephthalate and polyethylene naphthalate, acrylic resins, such as polymethyl(meth)acrylate and polyethyl(meth)acrylate, polycarbonate, polystyrene and polystyrene. If flexibility is not particularly necessary, plastic plates, glass plates, etc. are employable, and they can be used in combination with, as the other surface members, opaque members, such as plastic films or sheets, aluminum plates, ceramic plates and stainless steel plates, when needed.

The process for producing a three-dimensionally ordered lattice of monodiperse spherical fine particles according to the invention comprises the steps of "preparation of solid-liquid suspension"—"optimum reduction of electrical conductivity of solid-liquid suspension"—"optimization of dispersion concentration of dispersoid spherical fine particles"—"particle alignment at low temperature of not higher than boiling point of dispersion medium"—"sealing of ordered structure with binder", as previously described. In this process, the monodisperse spherical fine particles dispersed as a dispersoid in the solid-liquid suspension are made to have a prescribed electrical conductivity by dialysis or the like, and the spherical fine particles having a particle size of not more than 30 μm, even those having a particle size of 0.01 to 30 μm, form a three-dimensionally ordered lattice. Greatly differently from the conventional dry process, the resulting three-dimensionally ordered lattice has no fear of occurrence of dry shrinkage cracks, and a different particle array is rarely present on a surface of the particle laminate and/or in the particle laminate. Moreover, a three-dimensionally ordered lattice of structurally high purity can be produced with high efficiency by a relatively simple process while formation of a heterogeneous ordered structure is effectively prevented.

In the present invention, the spherical fine particles are preferably monodisperse spherical colloidal particles of a black color type achromatic color selected from grayish white, gray, grayish black and black from the viewpoint of optical color-developing properties of the three-dimensionally ordered lattice, as previously described. That is to say, as also described previously, the three-dimensionally ordered lattice of spherical fine particles obtained by the invention is extremely homogeneous as a particle array structure having no different ordered structure, so that the surface of the ordered structure properly and effectively absorbs or reduces stray light other than the reflected light emitted around the particles, said stray light being attributable to scattering or transmission of a part of applied visible light, and the optical interference effect due to extreme homogeneity of the particle array structure is strengthened to make the color of the reflected light clearer. Further, the colloidal particles preferably have a colorless achromatic color having a lightness of not more than 5, preferably not more than 3. In the invention, therefore, the colloidal particles are more preferably specific organic or inorganic polymer spherical fine particles of a black color type achromatic color selected from grayish white, gray, grayish black and black whose lightness and saturation, as indicated by Munsell color system, are each almost 0.

The dispersion concentration of the monodisperse spherical fine particles dispersed as a dispersoid in the suspension, as expressed on the volume basis, is preferably adjusted to not more than 70%. If the dispersion concentration exceeds the upper limit, groups of particles aggregated at random are liable to occur, and the regular alignment of the particles to form a three-dimensionally ordered lattice sought by the invention tends to be markedly inhibited, so that such a concentration is undesirable. From the viewpoints of dispersion stability of the solid-liquid suspension and handling properties of the suspension, the upper limit of the dispersion concentration is desirably adjusted to about 40 to 60%. From the viewpoint of a rate for forming an ordered structure in a green sheet by a dry process or handling properties of the suspension, the lower limit is preferably not less than 20%, more preferably not less than 30%, particularly preferably not less than 40%, and in this case, the three-dimensionally ordered lattice of the invention can be prepared.

By the use of a solid-liquid suspension having been adjusted to have a specific dispersion concentration of the dispersoid spherical fine particles and a specific electrical conductivity in the invention, there can be produced a three-dimensionally ordered lattice which is free from a fear of occurrence of such dry shrinkage cracks as observed in a particle laminate formed by the conventional dry process, provides a particle laminate having no different particle array on a surface of the laminate and/or in the laminate, is structurally homogeneous and clearly exhibits various properties including optical properties as surface properties because of homogeneity.

In order that the three-dimensionally ordered lattice (particle array structure) formed by drying the specific suspension is sealed with a resin binder or an organic binder, any one of a polymerizable organic monomer solution (e.g., polymerizable organic monomer solution containing polymerization initiator), an organic polymer solution and an inorganic binder solution is applied or sprayed so as to fill a surface of the three-dimensionally ordered lattice and gaps among the three-dimensionally aligned particles, whereby the three-dimensionally ordered lattice can be stably fixed without impairing the particle array structure, though the details are not clear.

After any one of the polymerizable organic monomer solution, the organic polymer solution and the inorganic binder solution is applied or sprayed, polymerization or curing is carried out. In the present invention, the particles aligned and the binder do not necessarily have to be chemically fixed to each other, and they may be physically fixed to each other.

The organic or inorganic binder suitably used for sealing and fixing the three-dimensionally ordered lattice is preferably a transparent binder, and from the viewpoint that the aligned particles are optically clearly recognized in case of the chromatic color-developing three-dimensionally ordered lattice, it is important that the binder is a transparent binder having properties that a refractive index (nB) of the resin binder or the inorganic binder (i.e., polymer or cured product) is different from a refractive index (nP) of the spherical fine particles and the refractive index nB and the refractive index nP satisfy the relationship $|nP-nB|\geqq 0.05$. If the $|nP-nB|$ is less than 0.05, the lightness is lowered to thereby darken and lower color tone, so that such a value is undesirable.

The suspension prepared as above is cast on a flat base member, and the above-mentioned solution is sprayed or applied to form a suspension layer (or green sheet) of a considerable thickness. In the present invention, the suspension layer is exposed to a temperature of not lower than the freezing point of the dispersion medium in the solid-liquid suspension, preferably a low temperature of usual room temperature such as about 20° C.±5° C., whereby a three-dimensionally ordered lattice constituted of spherical fine particles regularly aligned longitudinally and laterally is gradually formed on the base member. In order to increase the rate for forming the three-dimensionally ordered lattice, the temperature for the exposure under still standing of the suspension layer can be properly raised to preferably not lower than 40° C., more preferably about 50° C. In the present invention, the exposure under still standing of the suspension layer can be properly carried out under reduced pressure of not higher than atmospheric pressure.

In the present invention, there is no specific limitation on the flat base member on which the green sheet (or suspension layer) is formed, and any of transparent, semi-transparent and opaque members is employable. Examples of such members include plastic films, rigid plastic sheets, glass plates, ceramic plates, various steel plates, stainless steel plates, aluminum alloy plates, copper plate, wood plate and fabrics. As the plastic members, usual organic polymers are employable without any restriction, provided that they have water resistance or solvent resistance because the suspension is cast thereon. Examples of the transparent members include polyesters, such as polyethylene terephthalate and polyethylene naphthalate, acrylic resins, such as polymethyl(meth)acrylate and polyethyl(meth)acrylate, polycarbonate and polystyrene.

The base member may be an adhesive sheet, and in this case, the base of the adhesive sheet can be at least one material selected from steel plate, stainless steel plate, aluminum plate, aluminum alloy plate, ceramic plate, mortar plate, glass plate, plastic plate, wood plate and thick paper.

The flat base member may be provided with a supporting member wherein a great number of deep-ditch divisions are regularly or irregularly arranged densely in the plane direction, and on such a base member, the suspension layer can be preferably formed in the invention. The supporting member is a mesh material made of stainless steel, a fluororesin or nylon. The mesh material has deep-ditch divisions having an opening of 50 to 200 μm and an aspect ratio of 0.4 to 0.8, and such a mesh material can be preferably used as the supporting member. Another embodiment of the supporting member is a negative or positive photoresist sheet wherein a great number of deep-ditch divisions having a pitch width of 1 μm to 10 mm and an aspect ratio of 0.5 to 2 are regularly or irregularly arranged densely in the plane direction, and such a photoresist sheet can be preferably used as the supporting member. By providing the supporting member, occurrence of cracks can be prevented in the invention though the reason is not clear. When the green sheet (or suspension layer) of a given thickness formed on the supporting member is dried, the particles suspended in the green sheet are aggregated by dry shrinkage force (or dry cohesive force) and aligned. In the present invention, the particles suspended are aggregated on a great number of the deep-ditch divisions uniformly arranged in the plane direction and aligned so as to be attracted into the deep-ditch divisions. Therefore, the dry shrinkage force occurring in the green sheet are divided and dispersed on the deep-ditch divisions, whereby the dry shrinkage force can be relaxed or eliminated.

In the present invention, the organic polymer monodisperse spherical colloidal particles are not necessarily restricted, but preferable are spherical particles of at least one organic polymer selected from (meth)acrylic polymers, (meth)acrylic-styrene polymers, fluorine substituted (meth) acrylic polymers and fluorine substituted (meth)acrylic-styrene polymers. Likewise, the inorganic polymer monodisperse spherical colloidal particles are not necessarily restricted, but preferable are spherical particles of at least one inorganic polymer selected from silica, alumina, silica-alumina, titania and titania-silica. In the present invention, it is an important feature that any of the organic or inorganic polymer particles are colloidal particles of a black color type achromatic color of gray to black, which have been colored with a dye or a pigment, and they are monodisperse spherical particles. That is to say, it is important that the colloidal particles having such a feature can be properly prepared as chargeable colloidal particles in the solid-liquid colloidal dispersion.

The three-dimensionally ordered lattice of monodisperse spherical fine particles obtained by the production process of the invention is formed as a film, a sheet or a molded product on various base members or in various containers through a green sheet of a solid-liquid suspension, as previously described. For example, a chromatic color-developing three-dimensionally ordered lattice develops a clear chromatic color of red to blue under irradiation with natural light, white light or fluorescence, and therefore, it can provide novel color materials for use in various fields, such as fields of interior decoration, decoration, design and display.

An ultraviolet or infrared ray reflecting three-dimensionally ordered lattice can provide novel ultraviolet or infrared ray screening materials of various forms.

In particular, a chromatic color-developing three-dimensionally ordered lattice develops spectral colors according to the particle size (d) under irradiation with visible rays, and therefore, it can provide optical modulation materials of various forms, light quantity adjusting filters, color filters, films or sheets for preventing looking in rooms, etc.

By the use of the process for producing a three-dimensionally ordered lattice according to the invention, there can be provided novel various functional coated materials comprising various plates or sheets, such as glass plate, plastic plate, steel plate, stainless steel plate, ceramic plate, wood plate, fur sheet and fabric sheet, and the three-dimensionally ordered lattice of spherical fine particles having various functions applied thereto.

INDUSTRIAL APPLICABILITY

The fluid colloidal crystals of the invention provided as a solid-liquid colloidal dispersion of colloidal particles can be obtained as those enclosed between transparent members facing each other, a width of a gap between said transparent members (i.e., thickness of the resulting crystal layer) being not less than 400 nm and constant and an occupied surface of said transparent members in the plane direction being not specifically restricted. The fluid colloidal crystals can be used as those enclosed between various transparent members, such as flexible plastic films, rigid plastic sheets, glass plates and combinations thereof.

According to the present invention, the fluid colloidal crystals may be used as those enclosed in other transparent members than the above-mentioned plane members, such as a double cylindrical member, a double polygonal member, a double spherical member, a flexible fine tubular member and a hollow tubular member for optical fibers.

The fluid colloidal crystals of the invention enclosed in such members develop clear chromatic colors of red to blue under irradiation with natural light, white light or fluorescence, and therefore, novel color materials employable in various fields, such as fields of interior decoration, decoration, design and display, can be provided.

By effectively utilizing such optical properties, optical modulation materials of various forms, light quantity adjusting filters, color filters, films or sheets for preventing looking in rooms, etc. can be provided, in addition to the color materials utilizing spectral color development of the fluid colloidal crystals that develop spectral colors according to the interparticle distance (L).

By systematizing on-off of light irradiation as a matrix, novel non-electric field type color display devices substituting for electric field type display devices such as LCD, PDA, PLD, LED and PDP can be provided.

The three-dimensionally ordered lattice of monodisperse spherical fine particles obtained by the production process of the invention is formed as a film, a sheet or a molded product on various base members or in various containers, and a chromatic color-developing three-dimensionally ordered lattice develops a clear chromatic color as a spectral diffraction color under irradiation with natural light, white light or fluorescence according to the particle size (d). Therefore, not only novel color materials for various fields, such as fields of interior decoration, decoration, design and display, but also optical modulation materials of various forms, light quantity adjusting filters, color filters, films or sheets for preventing looking in rooms, etc. can be provided.

The three-dimensionally ordered lattice of spherical fine particles having a specific particle size obtained by the production process of the invention undergoes ultraviolet or infrared ray reflection under irradiation with ultraviolet rays or infrared rays, and therefore, novel ultraviolet or infrared ray screening materials of various forms can be provided.

By the use of the process for producing a three-dimensionally ordered lattice according to the invention, a coating film of a three-dimensionally ordered lattice of spherical fine particles having various functions is formed, and therefore, there can be provided various functional coated materials comprising various plates or sheets, such as glass plate, plastic plate, steel plate, stainless steel plate, ceramic plate, wood plate, fur sheet and fabric sheet, and the three-dimensionally ordered lattice of spherical fine particles having various functions applied thereto.

EXAMPLES

The present invention is further described with reference to the following examples, but it should be construed that the invention is in no way limited to those examples.

Reference Example 1

Monodisperse spherical particles of a black color type achromatic color for use in the invention were prepared. In a 1-liter four-necked flask, 100 parts by weight of methyl methacrylate (MMA) as a monomer, 7.5 parts by weight of C.I Solvent Black 27 as a black dye, 0.6 part by weight of sodium dodecylbenzenesulfonate and 290 parts by weight of water were placed, then they were stirred and mixed, and the mixture was heated to 80° C. with stirring under purging of the flask with nitrogen. Then, 0.5 part by weight of potassium persulfate was added, and polymerization reaction was performed at 80° C. for about 7 hours. In the suspension (S1) obtained by this soap-free emulsion polymerization, black polymer particles which were almost monodisperse spherical particles having a mean volume diameter, as measured by an electron microscope method and expressed on the volume basis, of 180 nm were contained. The volume concentration of the diepersoid particles in the suspension (S1) was 29%.

Example 1

From the suspension (S1), impurities such as an unreacted monomer and an emulsifying agent were removed, and the suspension (S1) was subjected to dialysis to reduce the electrical conductivity to 400 μS/cm from the initial value of 4000 μS/cm. The thus dialyzed suspension was gradually concentrated to a volume concentration of 36%. At this time, the visually sensed color of the solid-liquid colloidal dispersion (suspension) in the vertical direction was a spectral diffraction color of green.

Example 2

In a 1-lieter four-necked flask, 80 parts by weight of MMA and 1.0 part by weight of benzoyl peroxide were placed to give a solution, then 200 parts by weight of water, 3.3 parts by weight of polyoxyethylene polycyclic phenyl ether sulfuric ester salt as an emulsifying agent and 6.5 parts by weight of C.I Solvent Black 27 as a black dye were added, and they were mixed with vigorous stirring. Subsequently, to the mixture were added 28.6 parts by weight of the suspension (S1) obtained in Reference Example 1. The resulting mixture was mildly stirred at 50° C. for 0.5 hour and then reacted at 75° C. for 1.5 hours to obtain a suspension (S2) of polymer particles. In the resulting suspension (S2), black polymer particles which were monodisperse spherical particles having a mean volume diameter, as measured by an electron microscope method and expressed on the volume basis, of 200 nm were formed. The volume concentration of the solids was 21%. From the suspension, impurities such as an unreacted monomer and an emulsifying agent were removed, and the suspension was subjected to dialysis to reduce the electrical conductivity to 400 μS/cm from the initial value of 4000 μS/cm. The thus dialyzed suspension was gradually concentrated to a volume concentration of 42%. At this time, the visually sensed color of the solid-liquid colloidal dispersion (suspension) in the vertical direction was a spectral diffraction color of red.

Example 3

A suspension was prepared in the same manner as in Example 2, except that the electrical conductivity was reduced to 100 μS/cm by dialysis. The suspension was gradually concentrated to a volume concentration of 38%. At this time, the visually sensed color of the solid-liquid colloidal dispersion (suspension) in the vertical direction was a spectral diffraction color of red.

Example 4

A suspension was prepared in the same manner as in Example 2, except that MMA and MAA (weight ratio=90:10) were used as monomers. From the suspension, impurities were removed similarly to the above, and the suspension was subjected to dialysis to reduce the electrical conductivity to 400 μS/cm from 3900 μS/cm. The suspension was gradually concentrated to a volume concentration of 37%. At this time, the visually sensed color of the solid-liquid colloidal dispersion (suspension) in the vertical direction was a spectral diffraction color of red.

Example 5

A suspension was prepared in the same manner as in Example 3, except that the electrical conductivity was reduced to 100 μS/cm by dialysis. The suspension was gradually concentrated to a volume concentration of 31%. At this time, the visually sensed color of the solid-liquid colloidal dispersion (suspension) in the vertical direction was a spectral diffraction color of red. Although the suspension was further concentrated to a volume concentration of 54%, the spectral diffraction color of red was stable.

Example 6

In a 1-lieter four-necked flask, 78 parts by weight of MMA, 2 parts by weight of ethylene glycol dimethacrylate and 15 parts by weight of 2-hydroxyethyl methacrylate were placed. Then, 0.5 part by weight of benzoyl peroxide, 1.0 part by weight of dimethyl-2,2'-azobis-2-methyl propionate and 8 parts by weight of C.I Solvent Black 27 were added to give a solution. Thereafter, 250 parts by weight of water, 10 parts by weight of polyoxyethylene polycyclic phenyl ether sulfuric ester salt as an emulsifying agent and 0.1 part by weight of UNA-Na were added, and they were mixed with vigorous stirring. Subsequently, to the mixture were added 40 parts by weight of the suspension (S1) obtained in Reference Example 1. The resulting mixture was mildly stirred at 50° C. for 0.5 hour, then reacted at 78° C. for 1.5 hours and aged at 90° C. for 1.5 hours to obtain a suspension. In the resulting suspension, black polymer particles which were monodisperse spherical particles having a mean volume diameter, as measured by an electron microscope method and expressed on the volume basis, of 270 nm were dispersed. The volume concentration of the dispersoid particles in the suspension was 31%. The suspension was subjected to dialysis to reduce the electrical conductivity to 400 μS/cm from 3900 μS/cm and then gradually concentrated to a volume concentration of 37%. At this time, the visually sensed color of the solid-liquid colloidal dispersion (suspension) in the vertical direction was a spectral diffraction color of blue.

Comparative Example 1

A suspension was prepared in the same manner as in Example 2, except that dialysis was not carried out. The suspension was concentrated in the same manner as in Example 1. As a result, when the concentration became 38%, aggregation took place, and color development could not be confirmed.

Comparative Example 2

The suspension having undergone color development in Example 2 was further concentrated. As a result, when the concentration became 50%, aggregation took place, and color development could be hardly confirmed.

Comparative Example 3

A suspension was prepared in the same manner as in Example 4, except that dialysis was not carried out. The suspension was concentrated. As a result, color development did not occur even when the concentration became 37% by volume. When the concentration became 43%, aggregation took place, and color development could not be confirmed.

Comparative Example 4

The suspension having undergone color development in Example 4 was further concentrated. As a result, when the concentration became 54%, aggregation took place, and color development could be hardly confirmed.

Reference Example 2

In a 1-lieter four-necked flask, 80 parts by weight of MMA and 1.0 part by weight of benzoyl peroxide were placed to give a solution, then 200 parts by weight of water, 3.3 parts by weight of polyoxyethylene polycyclic phenyl ether sulfuric ester salt as an emulsifying agent and 6.5 parts by weight of C.I Solvent Black 27 as a black dye were added, and they were mixed with vigorous stirring. Subsequently, to the mixture were added 28.6 parts by weight of the dispersion (S1) obtained in Reference Example 1. The resulting mixture was mildly stirred at 50° C. for 0.5 hour and then reacted at 75° C. for 1.5 hours to obtain a dispersion (S2) of polymer particles. In the resulting dispersion (S2), black polymer particles which were monodisperse spherical particles having a mean volume diameter, as measured by an electron microscope method and expressed on the volume basis, of 210 nm were contained. The solids content was 29.8%.

Reference Example 3

In a 1-lieter four-necked flask, 78 parts by weight of MMA, 2 parts by weight of ethylene glycol dimethacrylate and 15 parts by weight of 2-hydroxyethyl methacrylate were placed. Then, 0.5 part by weight of benzoyl peroxide, 1.0 part by weight of dimethyl-2,2'-azobis-2-methyl propionate and 8 parts by weight of C.I Solvent Black 27 were added to give a solution. Thereafter, 250 parts by weight of water, 10 parts by weight of polyoxyethylene polycyclic phenyl ether sulfuric ester salt as an emulsifying agent and 0.1 part by weight of UNA-Na were added, and they were mixed with vigorous stirring. Subsequently, to the mixture were added 40 parts by weight of the dispersion (S1) obtained in Reference Example 1. The resulting mixture was mildly stirred at 50° C. for 0.5 hour, then reacted at 78° C. for 1.5 hours and aged at 90° C. for 1.5 hours to obtain a dispersion of polymer particles. In the resulting dispersion, black polymer particles which were monodisperse spherical particles having a mean volume diameter, as measured by an electron microscope method and expressed on the volume basis, of 270 nm were contained. The solids content was 31%.

Example 7

On a base member composed of a smooth nylon base sheet and a nylon mesh material bonded thereto which was provided with deep-ditch divisions having an opening of 60 μm and an aspect ratio of 0.67, a three-dimensionally ordered lattice was formed by the use of a suspension which had been obtained by preparing an emulsion having a suspended particle concentration of 30% using the dispersion (S1) obtained in Reference Example 1 and desalting the emulsion by an ion-exchange resin. The visually sensed color of the three-dimensionally ordered lattice in the vertical direction was a chromatic color of clear purple. Further, any crack was not visually observed on the sheet.

Example 8

On a base member composed of a glass base plate and a stainless steel mesh material bonded thereto which was provided with deep-ditch divisions having an opening of 150 μm and an aspect ratio of 0.67, a three-dimensionally ordered lattice was formed by the use of a suspension which had been obtained by preparing an emulsion having a suspended particle concentration of 38% using monodisperse spherical particles of a black color type achromatic color having a mean volume diameter of 210 nm or 270 nm obtained in Reference Example 2 or Reference Example 3 and desalting the emulsion by an ion-exchange resin. The visually sensed color of the three-dimensionally ordered lattice in the vertical direction was a chromatic color of clear green or clear red. Further, any crack was not visually observed on each sheet.

Example 9

A positive photoresist was applied onto a glass base plate and prebaked to form a photoresist layer having a thickness of 3 μm. Then, the photoresist layer is exposed through a mask pattern so that deep-ditch divisions (grooves) having a pitch width of 4 μm, an aspect ratio of 0.75 and a bank width of 2 μm should be regularly arranged in the plane direction, then developed and post baked to form a color-developing substrate sheet using a photoresist. Subsequently, an emulsion having a suspended particle concentration of 35% was prepared using the monodisperse spherical particles of a black color type achromatic color having a mean volume diameter of 270 nm obtained in Reference Example 3, and then the emulsion was desalted by an ion-exchange resin to prepare a suspension. Using the suspension, a three-dimensionally ordered lattice was formed. The visually sensed color of the three-dimensionally ordered lattice in the vertical direction was a chromatic color of clear red. Further, any crack was not visually observed on the sheet.

Example 10

To a monomer solution of 90 parts by weight of styrene and 10 parts by weight of MMA, 0.02 part by weight of an emulsifying agent SDS and 0.95 part by weight of a polymerization initiator KP were added, and emulsion polymerization was performed to prepare a suspension of monodisperse white spherical particles (dispersion concentration: 25%) having a mean volume diameter of 240 nm. Then, acetone, a black dye (5), a reactive emulsifying agent (1) and water were added to color the spherical particles black. Subsequently, the resulting suspension was passed through a semi-permeable membrane to give a solid-liquid suspension having an electrostatic charging degree of about 300 μS/cm in terms of an electrical conductivity. Then, the solid-liquid suspension was concentrated to give a suspension (S4) in which black spherical fine-particles were dispersed as a dispersoid in a concentration of about 40% in terms of a volume concentration. Subsequently, a glass plate having been treated with a hydrophilic sizing agent SK Dyne 2094 was coated with the suspension (S4) by means of a doctor blade (No. 2) to form a green sheet of the suspension (S4). The green sheet dried at room temperature, then coated with a binder solution of 100 parts by weight of a fluorine monomer (perfluorooctylethyl acrylate) and 5 parts by weight of a photopolymerization initiator, and then subjected to UV irradiation to perform polymerization and curing, whereby a three-dimensionally ordered lattice of black spherical fine particles was sealed and fixed. The resulting three-dimensionally ordered lattice developed an optical color of extremely clear green under irradiation with visible rays.

From the reflection spectra and the transmission spectrum shown in FIGS. 3 to 6 which are obtained under irradiation with ultraviolet rays, visible rays and infrared rays, it can be well understood that a three-dimensionally ordered lattice of spherical fine particles, which undergoes clear chromatic color development, ultraviolet ray reflection and infrared ray reflection, can be obtained by the "first production process" of the invention.

Figure 3:
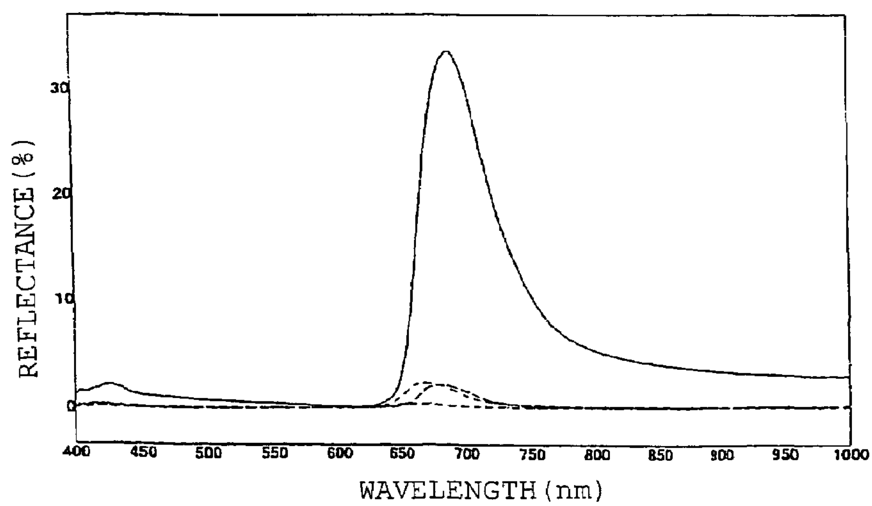
FIG. 3 shows a visible ray reflection spectrum of a three-dimensionally ordered lattice of specific spherical fine particles havina a black color type achromatic color produced by the present invention.

(1) FIG. 3 shows a visible ray spectral property reflection spectrum obtained when the three-dimensionally ordered lattice (binder sealed product) composed of organic polymer specific spherical fine particles of a black color type achromatic color having a mean volume diameter of 330 nm, which is produced by the "second production process" of the invention, is irradiated with natural light or white light. The chromatic color visually sensed is clear purple.

Figure 4:
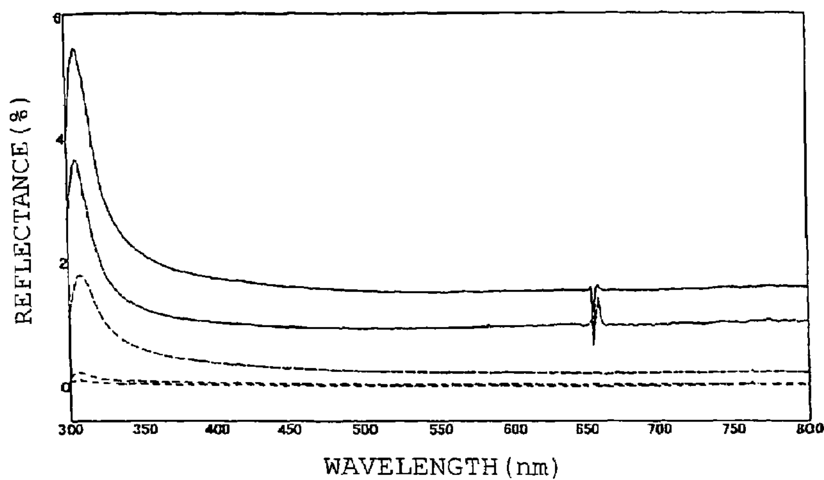
FIG. 4 shows an ultraviolet ray reflection spectrum of a three-dimensionally ordered lattice of specific spherical fine particles produced by the present invention.

(2) FIG. 4 shows an ultraviolet ray reflection spectrum obtained when the three-dimensionally ordered lattice (binder sealed product) composed of organic polymer specific spherical fine particles having a mean volume diameter of 110 nm, which is produced by the "third production process" of the invention, is irradiated with ultraviolet rays having a wavelength of not more than 400 nm. The three-dimensionally ordered lattice clearly exhibits ultraviolet ray reflection properties.

Figure 5:
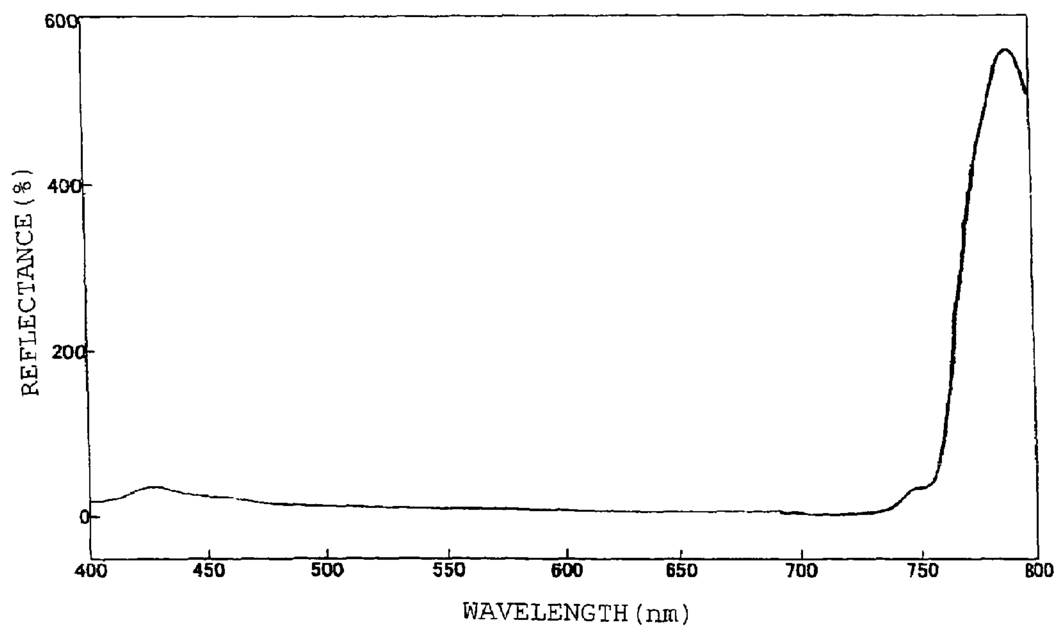
FIG. 5 shows an infrared ray reflection spectrum of a three-dimensionally ordered lattice of specific spherical fine particles produced by the present invention.
Figure 6:
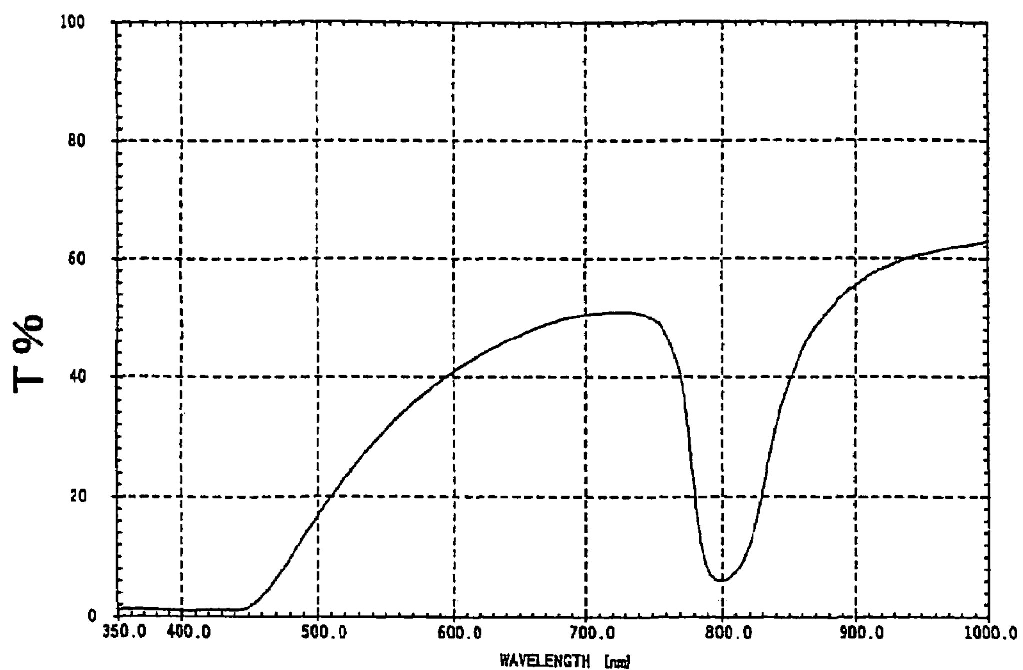
FIG. 6 shows an infrared ray transmission spectrum of a three-dimensionally ordered lattice of specific spherical fine particles shown in FIG. 5 in the infrared region.

(3) FIG. 5 shows an infrared ray reflection spectrum obtained when the three-dimensionally ordered lattice (binder sealed product) composed of organic polymer specific spherical fine particles having a mean volume diameter of 350 nm, which is produced by the "fourth production process" of the invention, is irradiated with infrared rays having a wavelength of 800 to 1500 nm. FIG. 6 shows an infrared ray transmission spectrum obtained when the same three-dimensionally ordered lattice (binder sealed product, sheet thickness: 20 μm) as above is irradiated with infrared rays having a wavelength of 800 to 1500 nm. It can be seen from these spectra that the three-dimensionally ordered lattice has excellent infrared ray reflection properties.

The invention claimed is:

1. Fluid colloidal crystals comprising a solid-liquid colloidal dispersion containing monodisperse spherical colloidal particles as a dispersoid, wherein:

the spherical colloidal particles are organic or inorganic polymer monodisperse dispersoid spherical colloidal particles having a mean volume diameter (d) of not more than 30 μm and having one achromatic color selected from grayish white, gray, grayish black and black which have been colored with a dye or a pigment, the solid-liquid colloidal dispersion comprises the dispersoid having a dispersion concentration, as expressed on the volume basis, of not less than 20% and not more than 70% and an aqueous solution or a water-containing non-aqueous solution as a dispersion medium, around the dispersoid spherical colloidal particles in the solid-liquid colloidal dispersion having an electrostatic charging degree of not more than 2000 μS/cm in terms of an electrical conductivity, an electric double layer of a given thickness (Δe) is formed at a temperature of not lower than a freezing point of the dispersion medium solution, and the dispersoid spherical colloidal particles form a three-dimensionally ordered lattice that shows fluidity and is a particle array structure in which the spherical colloidal particles are longitudinally and laterally aligned in a lattice form while an interparticle distance (L) defined as a distance between centers of the particles arranged opposite to each other along the center line satisfies the relationship $(d)<(L)\leqq(d)+2(\Delta e)$.

2. The fluid colloidal crystals as claimed in claim 1, wherein the dispersoid spherical colloidal particles have a mean volume diameter (d) of 130 to 350 nm, and the three-dimensionally ordered lattice comprising the dispersoid spherical colloidal particles develops a clear chromatic spectral diffraction color under irradiation with natural light or white light.

3. The fluid colloidal crystals as claimed in claim 2, wherein the chromatic spectral diffraction color visually sensed, which is a vertical color appearance on the surface of the three-dimensionally ordered lattice, and the interparticle distance (L) satisfy any one of the following relationships (I) to (V):

(I) when (L) is in the range of 160 to 170 nm, the chromatic color developed is clear purple (P), (II) when (L) is in the range of 180 to 195 nm, the chromatic color developed is clear blue (B), (III) when (L) is in the range of 200 to 230 nm, the chromatic color developed is clear green (G), (IV) when (L) is in the range of 240 to 260 nm, the chromatic color developed is clear yellow (Y), and (V) when (L) is in the range of 270 to 290 nm, the chromatic color developed is clear red (R).

4. The fluid colloidal crystals as claimed in claim 1, wherein the dispersoid colloidal particles have a mean volume diameter (d) of 10 to 130 nm, and the three-dimensionally ordered lattice comprising the dispersoid colloidal particles exhibits ultraviolet ray reflection properties under irradiation with ultraviolet rays having a wavelength of not more than 400 nm.

5. The fluid colloidal crystals as claimed in claim 1, wherein the dispersoid colloidal particles have a mean volume diameter (d) of 350 to 800 nm, and the three-dimensionally ordered lattice comprising the dispersoid colloidal particles exhibits infrared ray reflection properties under irradiation with infrared rays having a wavelength of 800 to 1500 nm.

6. The fluid colloidal crystals as claimed in claim 1, wherein the dispersoid colloidal particles are organic polymer spherical particles of at least one polymer selected from (meth)acrylic polymers, (meth)acrylic-styrene polymers, fluorine substituted (meth)acrylic polymers and fluorine substituted (meth)acrylic-styrene polymers.

7. A process for producing a three-dimensionally ordered lattice of spherical fine particles, comprising:

preparing fluid colloidal crystals (S-1) comprising, as a dispersoid, organic or inorganic polymer monodisperse spherical colloidal particles having a mean volume diameter (d) of not more than 30 μm and having one achromatic color selected from grayish white, gray, grayish black and black, which have been colored with a dye or a pigment, and as a dispersion medium, an aqueous solution or a water-containing non-aqueous solution, wherein the dispersion concentration of the colloidal particles, as expressed on the volume basis, is not less than 20% and not more than 70%, around the dispersoid spherical colloidal particles in the solid-liquid colloidal dispersion having an electrostatic charging degree of not more than 2000 μS/cm in terms of an electrical conductivity, an electric double layer of a given thickness (Δe) is formed at a temperature of not lower than a freezing point of the dispersion medium solution, and the dispersoid spherical colloidal particles form a three-dimensionally ordered lattice that shows fluidity and is a particle array structure in which the spherical colloidal particles are longitudinally and laterally aligned in a lattice form while an interparticle distance (L) defined as a distance between centers of the particles arranged opposite to each other along the center line satisfies the relationship $(d)<(L)\leqq(d)+2(\Delta e)$, then forming a green sheet of the suspension of the above (S-1) and exposing the green sheet to an atmosphere having a temperature exceeding the freezing point of the dispersion medium to dry the green sheet and thereby form a three-dimensionally ordered lattice of the spherical fine particles regularly aligned longitudinally and laterally, and subsequently applying or spraying any one of a polymerizable organic monomer solution, an organic polymer solution and an inorganic binder solution so as to fill a surface of the three-dimensionally ordered lattice and gaps among the three-dimensionally aligned particles, followed by polymerization or curing.

8. A process for producing a three-dimensionally ordered lattice of spherical fine particles, comprising:

preparing fluid colloidal crystals (S-2) comprising, as a dispersoid, organic or inorganic polymer monodisperse spherical fine particles having one achromatic color selected from grayish white, gray, grayish black and black, which have been colored with a dye or a pigment, and having a mean volume diameter (d) of 130 to 350 nm, and as a dispersion medium, an aqueous solution or a water-containing non-aqueous solution, wherein the dispersion concentration of the dispersoid, as expressed on the volume basis, is not less than 20% and not more than 70%, and the electrical conductivity of the solid-liquid dispersion is not more than 2000 μS/cm, then forming a green sheet of the suspension of the above (S-2) and exposing the green sheet to an atmosphere having a temperature exceeding a freezing point of the dispersion medium to dry the green sheet and thereby form a three-dimensionally ordered lattice of the spherical fine particles regularly aligned longitudinally and laterally, and subsequently applying or spraying any one of a polymerizable organic monomer solution, an organic polymer solution and an inorganic binder solution, a refractive index (nB) of a polymer or a cured product obtained from said solution being different from a refractive index (nP) of the spherical fine particles, so as to fill a surface of the three-dimensionally ordered lattice and gaps among the three-dimensionally aligned particles, followed by polymerization or curing.

9. A process for producing a three-dimensionally ordered lattice of spherical fine particles, comprising:

preparing fluid colloidal crystals (S-3) comprising, as a dispersoid, organic or inorganic polymer monodisperse spherical fine particles having a mean volume diameter (d) of 10 to 130 nm and having one achromatic color selected from grayish white, gray, grayish black and black, which have been colored with a dye or a pigment, and as a dispersion medium, an aqueous solution or a water-containing non-aqueous solution, wherein the dispersion concentration of the dispersoid, as expressed on the volume basis, is not less than 20% and not more than 70%, and the electrical conductivity of the solid-liquid dispersion is not more than 2000 μS/cm, then forming a green sheet of the suspension of the above (S-3) and exposing the green sheet to an atmosphere having a temperature exceeding a freezing point of the dispersion medium to dry the green sheet and thereby form a three-dimensionally ordered lattice of the spherical fine particles regularly aligned longitudinally and laterally, and subsequently applying or spraying any one of a polymerizable organic monomer solution, an organic polymer solution and an inorganic binder solution, a refractive index (nB) of a polymer or a cured product obtained from said solution being different from a refractive index (nP) of the spherical fine particles, so as to fill a surface of the three-dimensionally ordered lattice and gaps among the three-dimensionally aligned particles, followed by polymerization or curing.

10. A process for producing a three-dimensionally ordered lattice of spherical fine particles, comprising:

preparing fluid colloidal crystals (S-4) comprising, as a dispersoid, organic or inorganic polymer monodisperse spherical fine particles having a mean volume diameter (d) of 350 to 800 nm and having one achromatic color selected from grayish white, gray, grayish black and black, which have been colored with a dye or a pigment, and as a dispersion medium, an aqueous solution or a water-containing non-aqueous solution, wherein the dispersion concentration of the dispersoid, as expressed on the volume basis, is not less than 20% and not more than 70%, and the electrical conductivity of the solid-liquid dispersion is not more than 2000 μS/cm, then forming a green sheet of the suspension of the above (S-4) and exposing the green sheet to an atmosphere having a temperature exceeding a freezing point of the dispersion medium to dry the green sheet and thereby form a three-dimensionally ordered lattice of the spherical fine particles regularly aligned longitudinally and laterally, and subsequently applying or spraying any one of a polymerizable organic monomer solution, an organic polymer solution and an inorganic binder solution, a refractive index (nB) of a polymer or a cured product obtained from said solution being different from a refractive index (nP) of the spherical fine particles, so as to fill a surface of the three-dimensionally ordered lattice and gaps among the three-dimensionally aligned particles, followed by polymerization or curing.

11. The process for producing a three-dimensionally ordered lattice of spherical fine particles as claimed in claim 7, wherein the binder is a transparent binder satisfying the relationship $|nP-nB| \geqq 0.05$.

12. The process for producing a three-dimensionally ordered lattice of spherical fine particles as claimed in claim 7, wherein the green sheet is formed on a supporting member which is a mesh material made of stainless steel, a fluororesin or nylon and having groove divisions having an opening of 1 to 10 mm and an aspect ratio of 0.4 to 0.8.

13. The process for producing a three-dimensionally ordered lattice of spherical fine particles as claimed in claim 7, wherein the monodisperse spherical fine particles are organic polymer spherical particles of at least one polymer selected from (meth)acrylic polymers, (meth)acrylic-styrene polymers, fluorine substituted (meth)acrylic polymers and fluorine substituted (meth)acrylic-styrene polymers.

14. A process for producing a coating film of a three-dimensionally ordered lattice of spherical fine particles, comprising:

preparing fluid colloidal crystals (S-5) comprising, as a dispersoid, organic or inorganic polymer monodisperse spherical fine particles having a mean volume diameter (d) of 0.01 to 30 μm and having one achromatic color selected from grayish white, gray, grayish black and black, which have been colored with a dye or a pigment, and as a dispersion medium, an aqueous solution or a water-containing non-aqueous solution, wherein the dispersion concentration of the dispersoid, as expressed on the volume basis, is not less than 20% and not more than 70%, and the electrical conductivity of the solid-liquid dispersion is not more than 2000 μS/cm, applying the fluid colloidal crystals (S-5) onto a plate selected from a glass plate, a plastic plate, a steel plate, an aluminum plate, a stainless steel plate, a ceramic plate, a wood plate and a fabric sheet, then exposing the coated plate to an atmosphere having a temperature exceeding a freezing point of the dispersion medium to dry it and thereby form a three-dimensionally ordered lattice of the spherical fine particles regularly aligned longitudinally and laterally on the plate, and subsequently applying or spraying any one of a polymerizable organic monomer solution, an organic polymer solution and an inorganic binder solution so as to fill a surface of the three-dimensionally ordered lattice and gaps among the three-dimensionally aligned particles, followed by polymerization or curing to fix the three-dimensionally ordered lattice of spherical fine particles as a coating film.

15. The process for producing a three-dimensionally ordered lattice of spherical fine particles as claimed in claim 8, wherein the binder is a transparent binder satisfying the relationship $|nP-nB| \geqq 0.05$.

16. The process for producing a three-dimensionally ordered lattice of spherical fine particles as claimed in claim 9, wherein the binder is a transparent binder satisfying the relationship $|nP-nB| \geqq 0.05$.

17. The process for producing a three-dimensionally ordered lattice of spherical fine particles as claimed in claim 10, wherein the binder is a transparent binder satisfying the relationship $|nP-nB| \geqq 0.05$.

18. The process for producing a three-dimensionally ordered lattice of spherical fine particles as claimed in claim 8, wherein the green sheet is formed on a supporting member which is a mesh material made of stainless steel, a fluororesin or nylon and having groove divisions having an opening of 1 to 10mm and an aspect ratio of 0.4 to 0.8.

19. The process for producing a three-dimensionally ordered lattice of spherical fine particles as claimed in 9, wherein the green sheet is formed on a supporting member which is a mesh material made of stainless steel, a fluororesin or nylon and having groove divisions having an opening of 1 to 10 mm and an aspect ratio of 0.4 to 0.8.

20. The process for producing a three-dimensionally ordered lattice of spherical fine particles as claimed in 10, wherein the green sheet is formed on a supporting member which is a mesh material made of stainless steel, a fluororesin or nylon and having groove divisions having an opening of 1 to 10mm and an aspect ratio of 0.4 to 0.8.

21. The process for producing a three-dimensionally ordered lattice of spherical fine particles as claimed in claim 8, wherein the monodisperse spherical fine particles are organic polymer spherical particles of at least one polymer selected from (meth)acrylic polymers, (meth)acrylic-styrene polymers, fluorine substituted (meth)acrylic polymers and fluorine substituted (meth)acrylic-styrene polymers.

22. The process for producing a three-dimensionally ordered lattice of spherical fine particles as claimed in claim 9, wherein the monodisperse spherical fine particles are organic polymer spherical particles of at least one polymer selected from (meth)acrylic polymers, (meth)acrylic-styrene polymers, fluorine substituted (meth)acrylic polymers and fluorine substituted (meth)acrylic-styrene polymers.

23. The process for producing a three-dimensionally ordered lattice of spherical fine particles as claimed in claim 10, wherein the monodisperse spherical fine particles are organic polymer spherical particles of at least one polymer selected from (meth)acrylic polymers, (meth)acrylic-styrene polymers, fluorine substituted (meth)acrylic polymers and fluorine substituted (meth)acrylic-styrene polymers.

* * * * *